(12) United States Patent
Tani et al.

(10) Patent No.: US 9,247,419 B2
(45) Date of Patent: Jan. 26, 2016

(54) COMMUNICATION APPARATUS, INFORMATION PROCESSING APPARATUS, CONTROL METHODS THEREFOR, AND SYSTEM

(71) Applicant: CANON KABUSHIKI KAISHA, Tokyo (JP)

(72) Inventors: Kazuteru Tani, Yokohama (JP); Koichi Tanabe, Kawasaki (JP); Araki Matsuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/566,983

(22) Filed: Dec. 11, 2014

(65) Prior Publication Data

US 2015/0172910 A1 Jun. 18, 2015

(30) Foreign Application Priority Data

Dec. 13, 2013 (JP) .................. 2013-258700

(51) Int. Cl.
*H04M 1/00* (2006.01)
*H04W 8/20* (2009.01)
*H04L 12/58* (2006.01)
*H04L 29/08* (2006.01)

(52) U.S. Cl.
CPC ............... *H04W 8/205* (2013.01); *H04L 51/06* (2013.01); *H04L 67/16* (2013.01)

(58) Field of Classification Search
CPC ........ H04W 8/205; H04L 67/16; H04L 51/06
USPC ........................................................ 455/419
See application file for complete search history.

(56) References Cited

U.S. PATENT DOCUMENTS

| | | | |
|---|---|---|---|
| 2004/0015713 A1* | 1/2004 | Abe et al. ................. | 713/200 |
| 2006/0023255 A1* | 2/2006 | Kurotsu .................... | 358/1.15 |
| 2006/0215220 A1* | 9/2006 | Yamahara et al. ........ | 358/1.15 |
| 2006/0274757 A1* | 12/2006 | Kikkoji et al. ........... | 370/395.2 |
| 2007/0106712 A1* | 5/2007 | Yamato et al. ........... | 707/204 |
| 2008/0204803 A1* | 8/2008 | Ishida ....................... | 358/1.15 |
| 2008/0266466 A1* | 10/2008 | Yamagishi et al. ...... | 348/731 |
| 2010/0259778 A1* | 10/2010 | Kashioka .................. | 358/1.14 |
| 2012/0105901 A1* | 5/2012 | Miyazaki et al. ........ | 358/1.14 |

FOREIGN PATENT DOCUMENTS

JP 06-195307 A 7/1994

* cited by examiner

*Primary Examiner* — Juan A Torres
(74) *Attorney, Agent, or Firm* — Cowan, Liebowitz & Latman, P.C.

(57) ABSTRACT

A system includes a first apparatus which transmits identification information to a second apparatus and records management information from the second apparatus, the second apparatus which, if the management information has been received, compares the management information with management information recorded, and if the management information acquired from the first apparatus is different, transmits the management information to the first apparatus, if the management information has not been received, transmits an issuance request of management information to the information processing apparatus, and transmits the management information received from the information processing apparatus to the first apparatus, and records the transmitted management information and the received identification information, and an information processing apparatus which generates the management information and transmits the management information to the second apparatus.

18 Claims, 18 Drawing Sheets

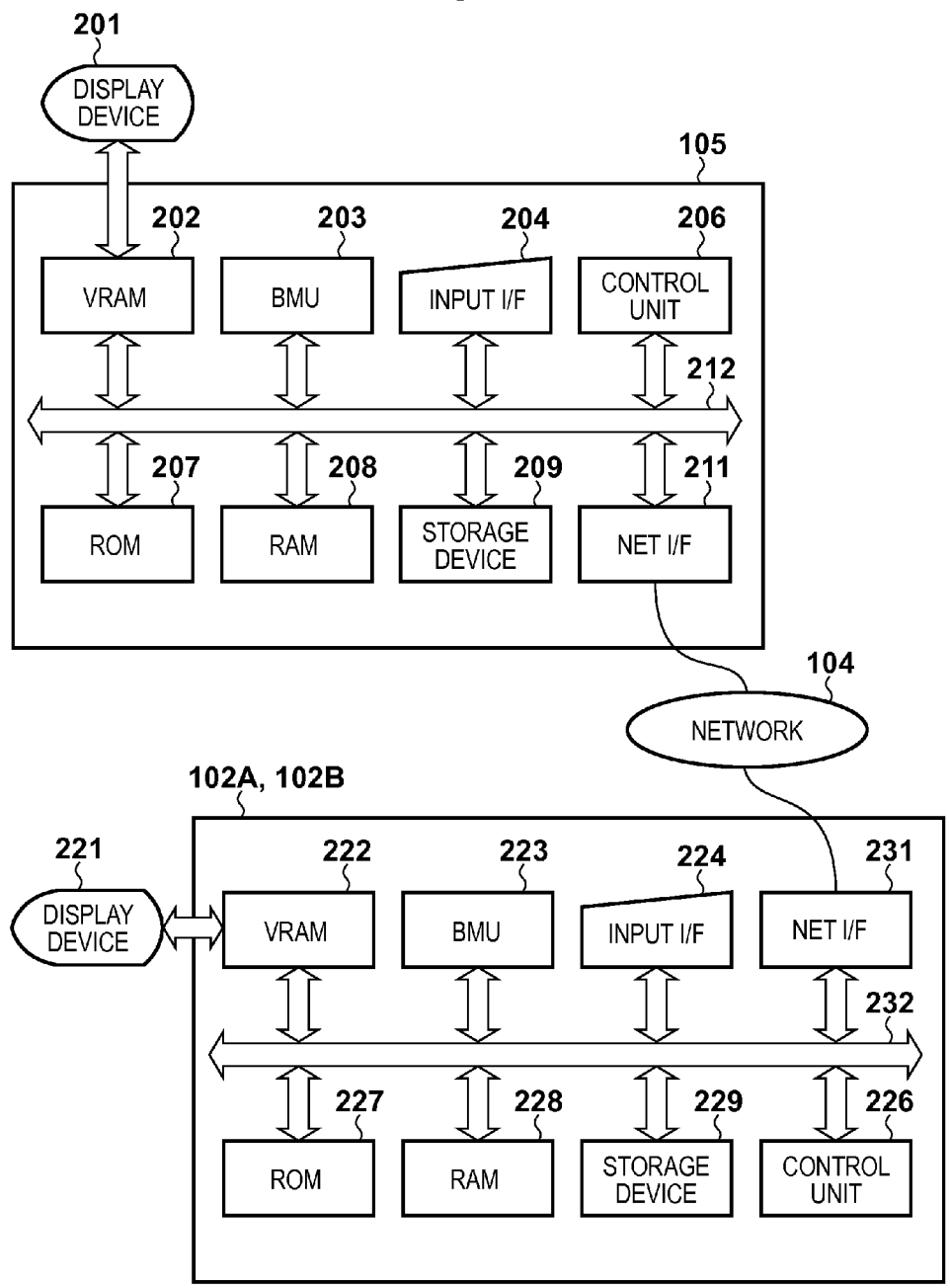

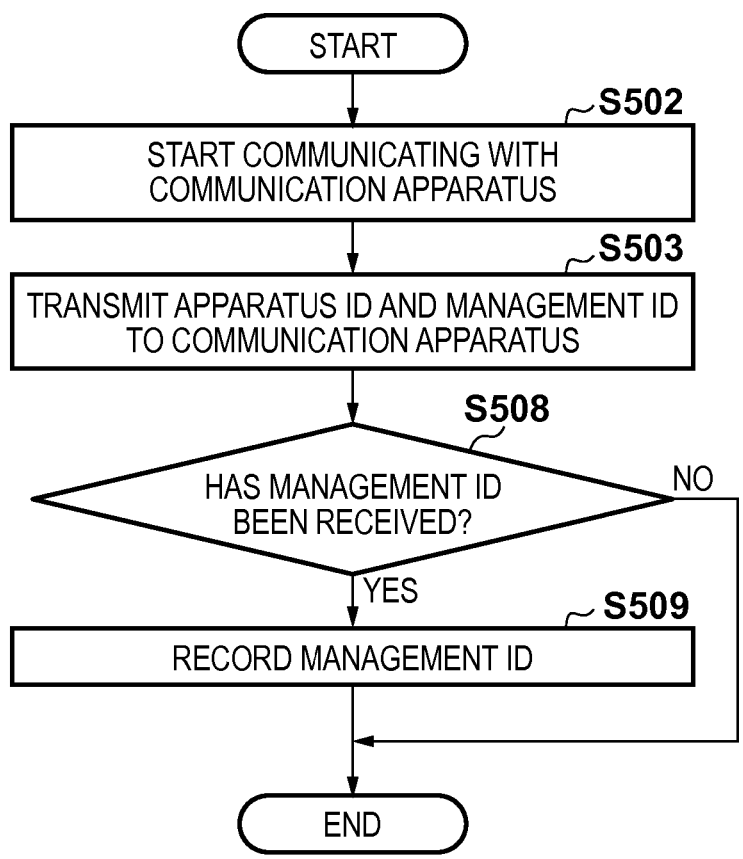

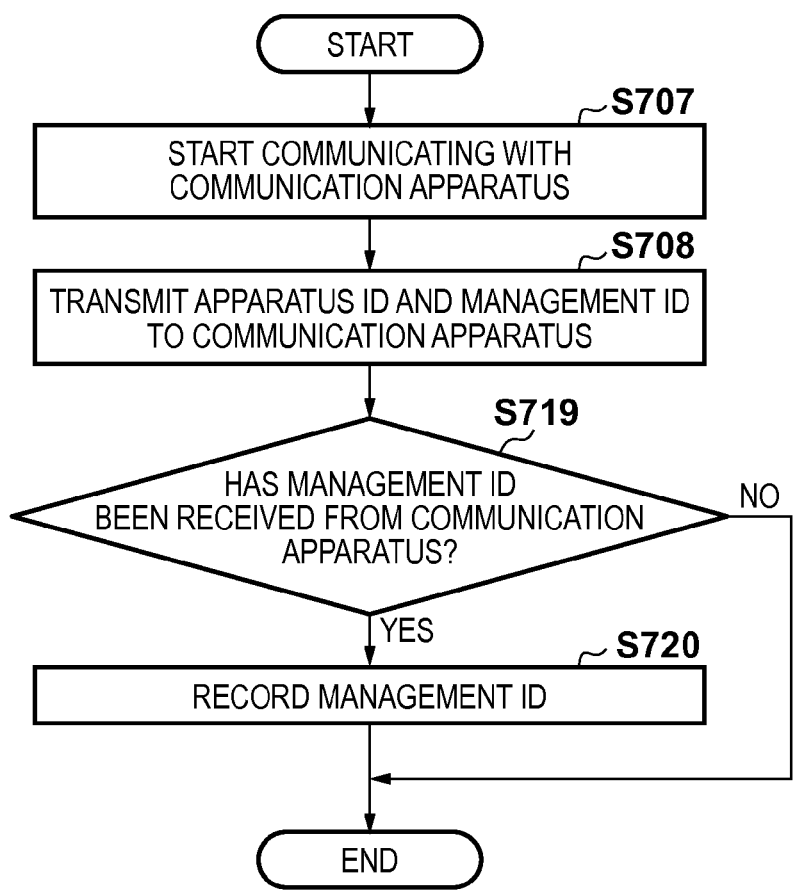

F I G. 8A
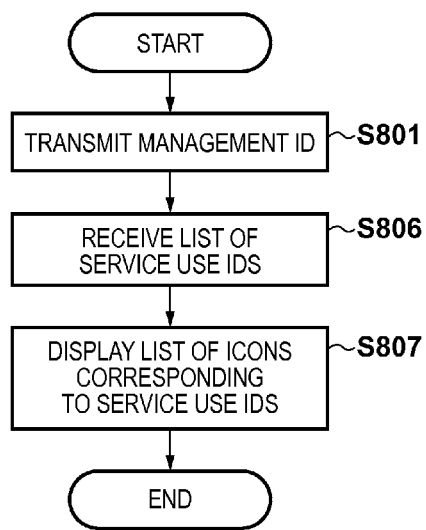
F I G. 8B
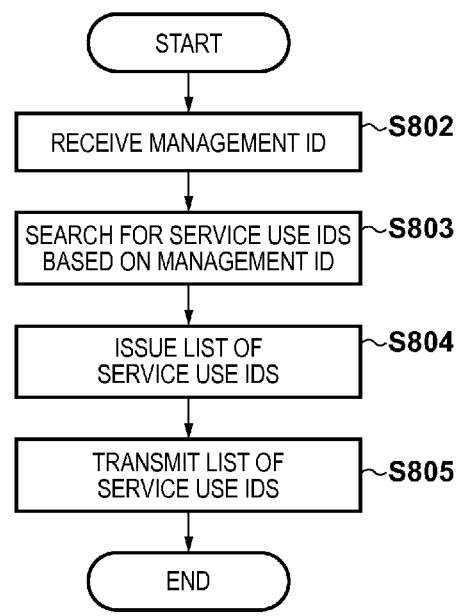

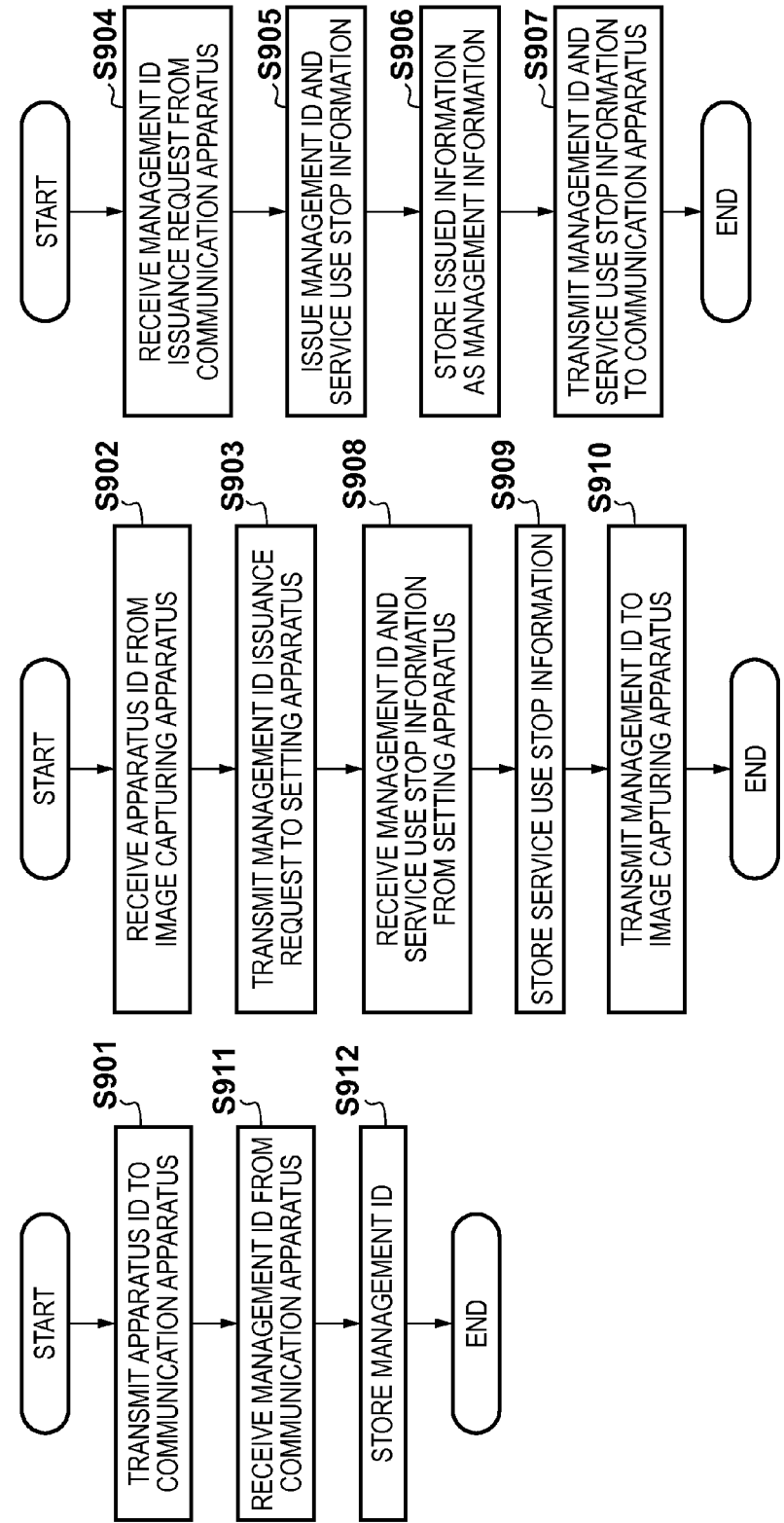

| MANAGEMENT ID | APPARATUS ID | SERVICE USE STOP INFORMATION |
|---|---|---|
| 0 | 0x000a | 0x0010 |
| 1 | 0x000b | 0x0011 |
| 2 | 0x000c | 0x0012 |
| 3 | 0x000d | 0x0013 |
| 4 | 0x000e | 0x0014 |

1001 1002 1003

| MANAGEMENT ID | APPARATUS ID | SERVICE USE STOP INFORMATION | USE STOP DATE/TIME |
|---|---|---|---|
| 0 | 0x000a | http://.../... | 19:38:50, 5, April, 2010 |
| 1 | 0x000b | http://.../... | |
| 2 | 0x000c | http://.../... | |
| 3 | 0x000d | http://.../... | |
| 4 | 0x000e | http://.../... | |

1301  1302  1303  1304

COMMUNICATION APPARATUS, INFORMATION PROCESSING APPARATUS, CONTROL METHODS THEREFOR, AND SYSTEM

CROSS-REFERENCES TO RELATED APPLICATIONS

This Application claims the benefits of Japanese Patent Application No. 2013-258700, filed Dec. 13, 2013 which is hereby incorporated by reference herein in its entirety.

BACKGROUND OF THE INVENTION

1. Field of the Invention

The present invention relates to a technique in which the user makes settings about an apparatus for using a network service in an apparatus for providing the network service by using a communication apparatus.

2. Description of the Related Art

Conventionally, when making settings about an apparatus for using a network service, the user transmits a mail address from his/her terminal to a server, and the server provisionally registers the received mail address. The server transmits, to the provisionally registered mail address, mail in which a registration format is described. Upon receiving information input according to the registration format from the terminal of the user, the server formally registers the provisionally registered mail address by recording the mail address in association with the received information. After registration, the server provides the corresponding service when the user inputs the formally registered mail address from the terminal (see Japanese Patent Laid-Open No. 06-195307).

In Japanese Patent Laid-Open No. 06-195307 described above, however, the user needs to input various kinds of information according to the registration format from the terminal before the mail address is formally registered, resulting in heavy load. Furthermore, before completion of input of various kinds of information, the user cannot use the service using the terminal.

SUMMARY OF THE INVENTION

The present invention has been made in consideration of the aforementioned problems, and realizes a technique which enables the user to quickly make settings about an apparatus for using a network service in an apparatus for providing the network service by using a communication apparatus with a simple procedure.

In order to solve the aforementioned problems, the present invention provides a system in which a first communication apparatus for using a service, a second communication apparatus for making settings about the service to be used by the first communication apparatus, and an information processing apparatus for providing the service are communicably connected, wherein the first communication apparatus comprises: a communication unit configured to communicate with the second communication apparatus; a transmission unit configured to transmit, among identification information of the first communication apparatus and management information about the settings of the service to be used by the first communication apparatus, at least the identification information to the second communication apparatus; and a recording unit configured to record management information received from the second communication apparatus, wherein the second communication apparatus comprises: a first transmission unit configured to, if the management information has been received from the first communication apparatus, compare the management information with management information recorded in the second communication apparatus, and if the management information acquired from the first communication apparatus is different, transmit the management information recorded in the second communication apparatus to the first communication apparatus; a second transmission unit configured to, if the management information has not been received from the first communication apparatus, transmit an issuance request of management information to the information processing apparatus, and transmit, to the first communication apparatus, the management information which has been received from the information processing apparatus in response to the issuance request of the management information; and a recording unit configured to record the management information transmitted to the first communication apparatus and the identification information acquired from the first communication apparatus in association with each other, and wherein the information processing apparatus comprises: a communication unit configured to communicate with the second communication apparatus; and a first transmission unit configured to generate the management information and transmit the management information to the second communication apparatus in response to the issuance request of the management information received from the second communication apparatus.

In order to solve the aforementioned problems, the present invention provides a second communication apparatus which is communicably connected to a first communication apparatus for using a service, and an information processing apparatus for providing the service, and makes settings about the service to be used by the first communication apparatus, comprising: a request unit configured to transmit, to the information processing apparatus, an issuance request of management information about the settings of the service to be used by the first communication apparatus; a reception unit configured to receive the management information from the information processing apparatus in response to the issuance request of the management information; a recording unit configured to record, in a storage unit, the management information received by the reception unit; an acquisition unit configured to acquire, among identification information of the first communication apparatus and management information about the settings of the service to be used by the first communication apparatus, at least the identification information from the first communication apparatus; and a transmission unit configured to transmit, to the first communication apparatus, the management information which is received by the reception unit from the information processing apparatus in response to the issuance request of the management information which is transmitted by the request unit to the information processing apparatus if the management information is not acquired from the first communication apparatus and the management information is not recorded in the recording unit, wherein the recording unit records the management information transmitted to the first communication apparatus and the identification information acquired from the first communication apparatus in association with each other.

In order to solve the aforementioned problems, the present invention provides an information processing apparatus for providing a service to be used by a first communication apparatus, comprising: a communication unit configured to communicate with a second communication apparatus for making settings about the service to be used by the first communication apparatus; a first reception unit configured to receive an issuance request of management information from the second communication apparatus; a transmission unit configured to generate the management information and transmit the management information to the second communication apparatus in response to the issuance request of the management information received from the second communication apparatus; a second reception unit configured to receive, from the second communication apparatus, the management information and service-related information set about the service; and a storing unit configured to store the service-related information and the management information in association with each other.

In order to solve the aforementioned problems, the present invention provides a first communication apparatus for using a service provided by an information processing apparatus, comprising: a communication unit configured to communicate with a second communication apparatus configured to make settings about the service to be used by the first communication apparatus; a first transmission unit configured to transmit, among identification information of the first communication apparatus and management information about the settings of the service to be used by the first communication apparatus, at least the identification information to the second communication apparatus; a recording unit configured to record management information received from the second communication apparatus; and a request unit configured to transmit a service use request to the information processing apparatus using the management information.

In order to solve the aforementioned problems, the present invention provides a control method for a second communication apparatus which is communicably connected to a first communication apparatus for using a service and an information processing apparatus for providing the service, and makes settings about the service to be used by the first communication apparatus, the method comprising the steps of: transmitting, to the information processing apparatus, an issuance request of management information about the settings of the service to be used by the first communication apparatus; receiving the management information from the information processing apparatus in response to the issuance request of the management information; recording the received management information; acquiring, among identification information of the first communication apparatus and management information about the settings of the service to be used by the first communication apparatus, at least the identification information from the first communication apparatus; and transmitting, to the first communication apparatus, the management information which is received from the information processing apparatus in response to the issuance request of the management information which is transmitted to the information processing apparatus if the management information is not acquired from the first communication apparatus and the management information is not recorded, wherein in the step of recording, the management information transmitted to the first communication apparatus and the identification information acquired from the first communication apparatus are recorded in association with each other.

In order to solve the aforementioned problems, the present invention provides a control method for an information processing apparatus which provides a service to be used by a first communication apparatus, the method comprising the steps of: communicating with a second communication apparatus for making settings about the service to be used by the first communication apparatus; receiving an issuance request of management information from the second communication apparatus; generating the management information and transmitting the management information to the second communication apparatus in response to the issuance request of the management information received from the second communication apparatus; receiving, from the second communication apparatus, the management information and service-related information set about the service; and storing the service-related information and the management information in association with each other.

In order to solve the aforementioned problems, the present invention provides a control method for a first communication apparatus which uses a service provided by an information processing apparatus, the method comprising the steps of: communicating with a second communication apparatus for making settings about the service to be used by the first communication apparatus; transmitting, among identification information of the first communication apparatus and management information about the settings of the service to be used by the first communication apparatus, at least the identification information to the second communication apparatus; recording management information received from the second communication apparatus; and transmitting a service use request to the information processing apparatus using the management information.

According to the present invention, the user can quickly make settings about an apparatus for using a network service in an apparatus for providing the network service by using a communication apparatus with a simple procedure.

Further features of the present invention will become apparent from the following description of exemplary embodiments (with reference to the attached drawings).

BRIEF DESCRIPTION OF THE DRAWINGS

FIG. 2 is a block diagram showing the configuration of a setting apparatus and communication apparatus according to the embodiment;

FIGS. 5A to 5C are flowcharts illustrating processing of issuing/acquiring/recording management information according to the first embodiment;

FIGS. 7A to 7C are flowcharts illustrating processing of issuing/acquiring/recording management information according to the second embodiment;

FIGS. 8A and 8B are flowcharts illustrating service use setting processing according to the second embodiment;

FIGS. 9A to 9C are flowcharts illustrating processing of issuing/acquiring/recording management information according to the third embodiment;

DESCRIPTION OF THE EMBODIMENTS

Figure 1:
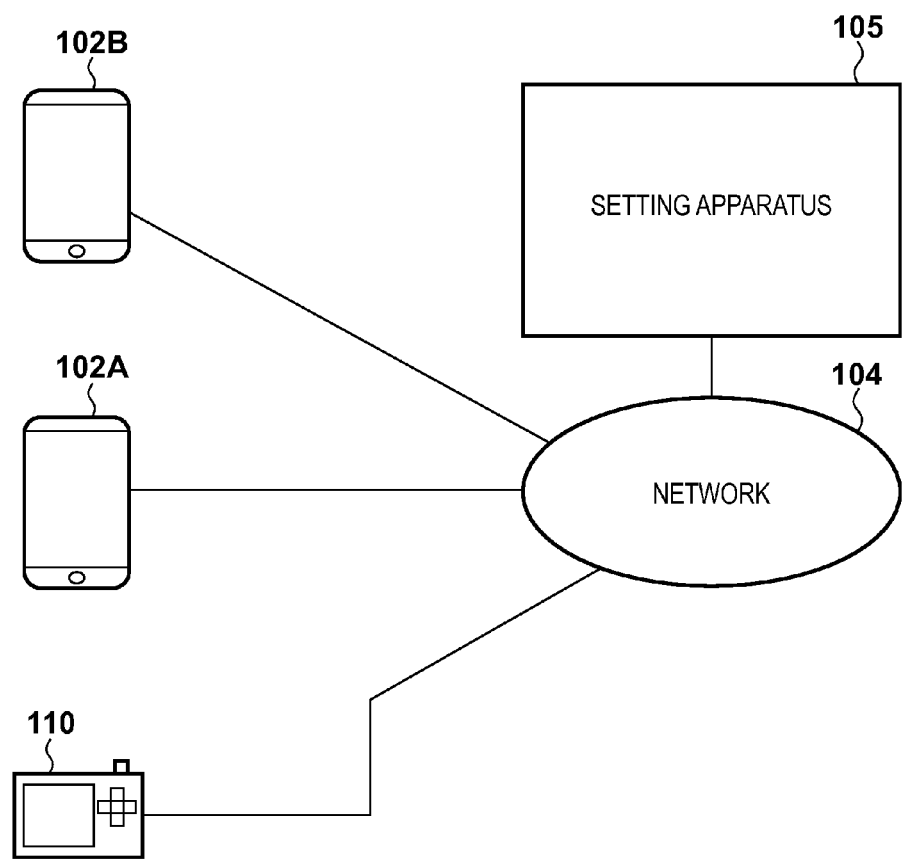
FIG. 1 is a view showing a system configuration according to an embodiment.

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

[First Embodiment] An embodiment of the present invention implemented by a system in which an image capturing apparatus such as a digital camera, a mobile communication apparatus such as a smartphone, and a setting apparatus such as a server apparatus are communicably connected via a network will be described below.

<System Configuration> A system configuration according to the embodiment will be explained first with reference to FIG. 1.

A system according to this embodiment includes an image capturing apparatus 110 for using a network service such as an online album site, one or a plurality of communication apparatuses 102A and 102B for making settings (to be referred to as service use settings hereinafter) about a service to be used by the image capturing apparatus 110, and a setting apparatus 105 for providing the service. In the system of this embodiment, it is possible to make service use settings of the image capturing apparatus 110 in the setting apparatus 105 connected to a network 104 by using the first communication apparatus 102A or the second communication apparatus 102B. That is, even if the image capturing apparatus 110 includes no sufficient operation unit for making service use settings, the user can make service use settings in the setting apparatus 105 via the network 104 using the first communication apparatus 102A or the second communication apparatus 102B.

The setting apparatus 105 is an information processing apparatus such as a server computer, and is communicably connected, via the network 104, to the image capturing apparatus 110 for using the service, and the first communication apparatus 102A and second communication apparatus 102B for making service use settings of the image capturing apparatus 110. Note that the setting apparatus 105 may be a single computer or the respective functions of the setting apparatus 105 may be distributed among a plurality of computers, as needed. For example, a function of managing registration, update, and deletion of management information (to be described later with reference to FIGS. 4A to 4E) and a function of providing an online service may be implemented by different apparatuses. Note that if the setting apparatus 105 is formed from a plurality of computers, the computers are communicably interconnected via a LAN or the like.

The image capturing apparatus 110 can communicate with the first communication apparatus 102A and the second communication apparatus 102B using a standard protocol capable of exchanging information via the network 104. The image capturing apparatus 110 is, therefore, a kind of communication apparatus. The image capturing apparatus 110 accesses the first communication apparatus 102A and the second communication apparatus 102B using a protocol such as HTTP, transmits information generated in a description language such as XML, and acquires and analyzes information generated in a description language such as HTML or XML. The image capturing apparatus 110 can display the analyzed information on a display unit, and present the information to the user.

Note that in this embodiment, the image capturing apparatus 110 such as a digital camera is exemplified as an apparatus without any sufficient operation unit for making service use settings. However, an information processing apparatus having no camera function may be used.

Each of the first communication apparatus 102A and second communication apparatus 102B is a smartphone, tablet terminal, personal computer (PC), or the like, and can operate a Web program having a standard protocol capable of exchanging information via the network 104.

By operating a Web browser program, each of the first communication apparatus 102A and second communication apparatus 102B accesses the image capturing apparatus 110 and setting apparatus 105 using a protocol such as HTTP, transmits information generated in a description language such as XML, and acquires and analyzes information generated in a description language such as HTML or XML. Each of the first communication apparatus 102A and second communication apparatus 102B can display the information analyzed according to an instruction of the Web browser program, thereby presenting the information to the user.

If, for example, the user makes service use settings of the image capturing apparatus 110 using the first communication apparatus 102A, the image capturing apparatus 110 and the first communication apparatus 102A are connected by wired or wireless connection. The first communication apparatus 102A confirms whether a management ID has been recorded in the image capturing apparatus 110. If no management ID has been recorded in the image capturing apparatus 110, the first communication apparatus 102A acquires a management ID from the setting apparatus 105, and records the acquired management ID in itself and also in the image capturing apparatus 110. On the other hand, if a management ID has been recorded in the image capturing apparatus 110, the first communication apparatus 102A acquires the management ID from the image capturing apparatus 110, and records acquired management ID. As described above, the first communication apparatus 102A can make service use settings of the image capturing apparatus 110 in the setting apparatus 105 without a UI (input of an ID and password, and the like) for performing user authentication. Note that processing of issuing/acquiring/recording a management ID will be described later.

A management ID is registered in the setting apparatus 105 for each image capturing apparatus in association with an apparatus ID for uniquely identifying the image capturing apparatus 110.

Each of the first communication apparatus 102A and second communication apparatus 102B (to be simply referred to as a communication apparatus hereinafter) can acquire the management ID registered in the setting apparatus 105 by inquiring of the setting apparatus 105 the apparatus ID of the image capturing apparatus 110.

As described above, according to the embodiment, it is possible to make service use settings of the image capturing apparatus 110 using another communication apparatus instead of the communication apparatus of the user.

Note that in this embodiment, the image capturing apparatus 110 is a target apparatus for which service use settings are made, for the sake of descriptive convenience. However, service use settings may be made for a general-purpose apparatus such as a smartphone, tablet terminal, or PC.

Note that according to the present invention, contents of management information, a unit for connecting the image capturing apparatus 110 and the communication apparatuses 102A and 102B, and a unit for issuing/acquiring/recording a management ID are not specifically limited, and any well-known units can be used.

<Configuration of Setting Apparatus> The configuration and function of the setting apparatus will be described with reference to FIG. 2.

Figure 7A:
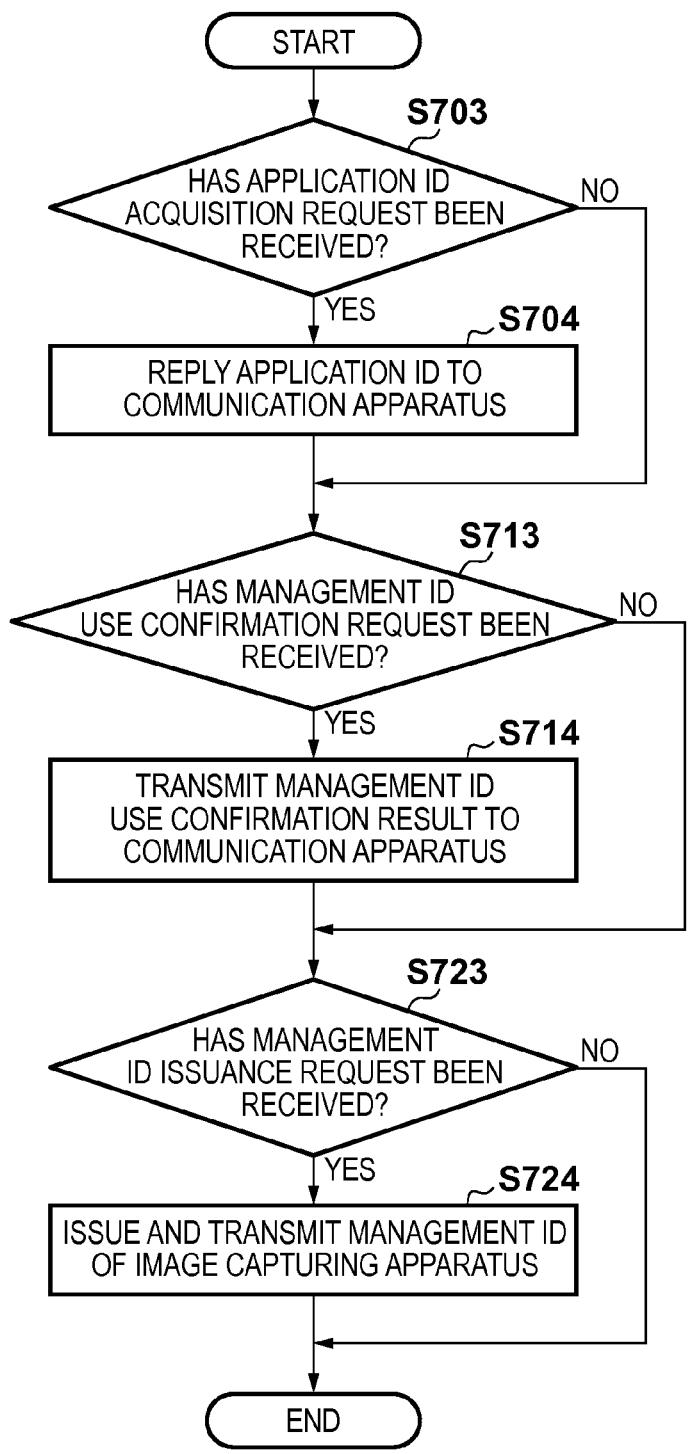
Figures 1, 7B:
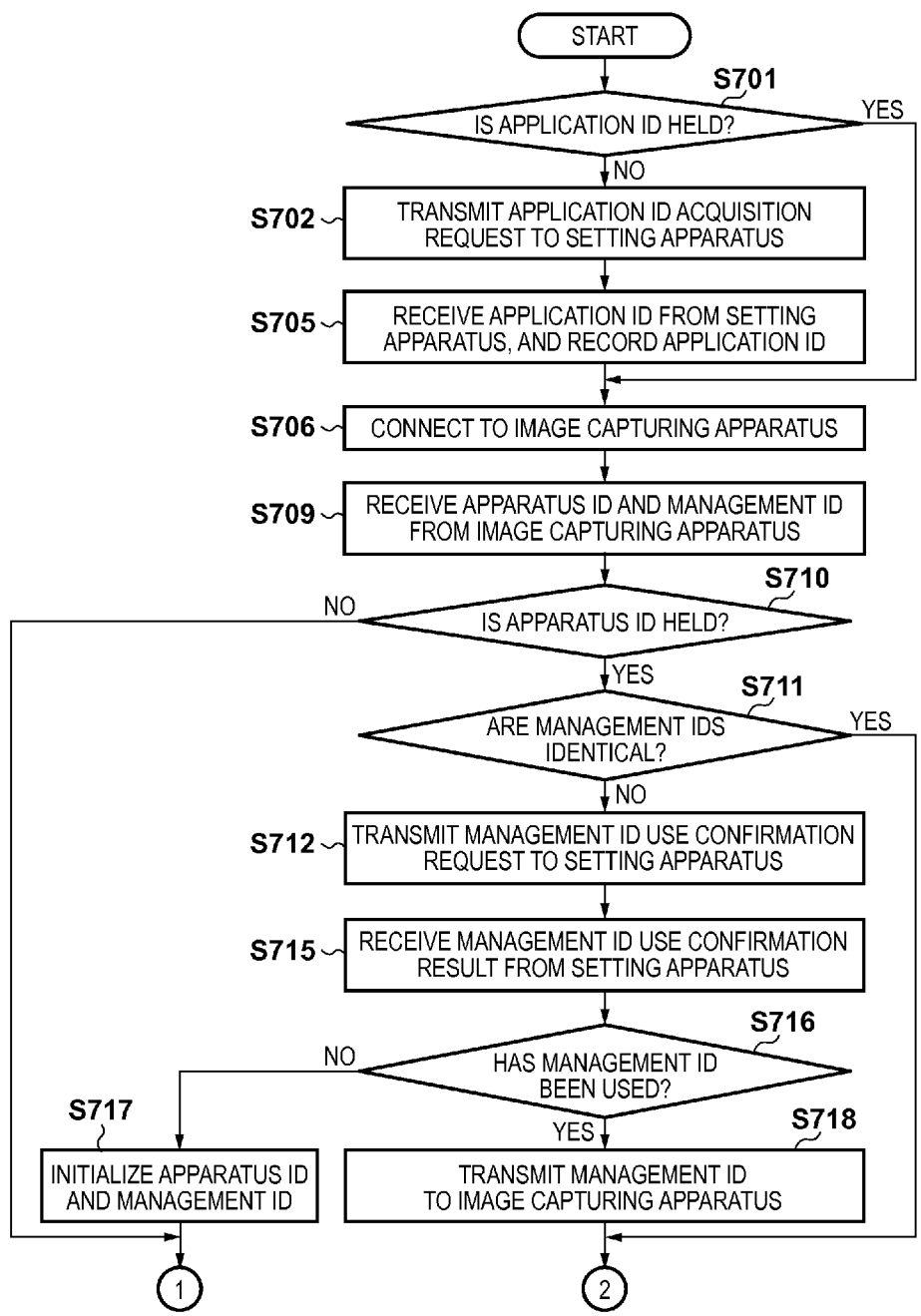
Figures 2, 7B:
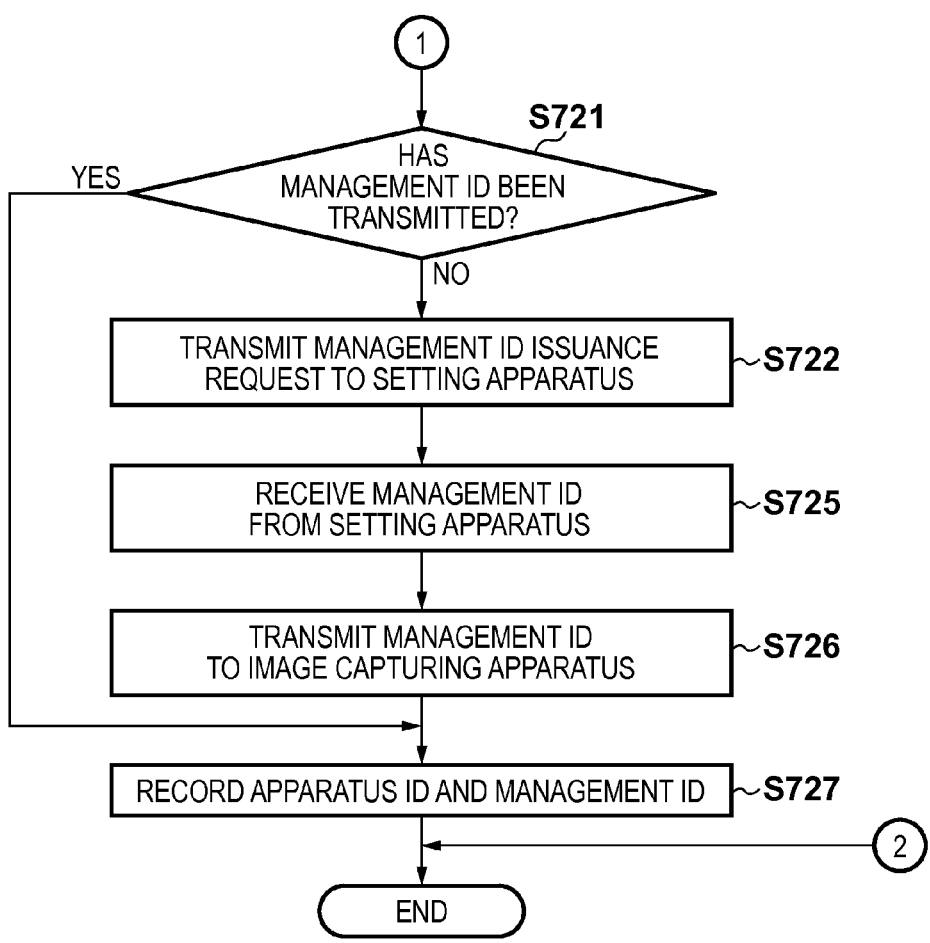

As shown in FIG. 2, the setting apparatus 105 includes a display device 201, VRAM 202, BMU 203, input I/F 204, control unit 206, ROM 207, RAM 208, storage device 209, network I/F 211, and bus 212.

The display device 201 displays, for example, management information about service use settings, icons, messages, menus, and other user interface information.

Image data for being displayed on the display device 201 is bitmapped in the VRAM 202. The image data generated in the VRAM 202 is transferred to the display device 201 according to a predetermined rule, and the display device 201 then displays an image.

The BMU (Bit Move Unit) 203 controls, for example, data transfer between memories (for example, between the VRAM 202 and another memory), and data transfer between a memory and each I/O device (for example, the network I/F 211).

The input I/F 204 is formed from operation members such as various switches, buttons, and a touch panel, and accepts various operations from the user.

The control unit 206 controls respective devices based on an OS and control programs stored in the ROM 207 and storage device 209.

The ROM 207 stores various control programs and data.

The RAM 208 includes work areas for the control unit 206, data save areas used for error processing, and load areas for control programs.

The storage device 209 is, for example, a hard disk or memory card, and stores control programs executed in the setting apparatus, a content, and data.

The network I/F 211 communicates with another information processing apparatus, printer, and the like via the network 104.

The bus 212 includes an address bus, a data bus, and a control bus.

A control program can be provided from the ROM 207 or storage device 209 to the CPU 206, or provided from another information processing apparatus or the like to the CPU 206 via a network using the network I/F 211.

Note that each of the communication apparatuses 102A and 102B also has the same configuration and function as those of the above-described setting apparatus 105, and includes a display device 221, VRAM 222, BMU 223, input I/F 224, control unit 226, ROM 227, RAM 228, storage device 229, network I/F 231, and bus 232.

<Configuration of Image Capturing Apparatus> The configuration and function of the image capturing apparatus will be described with reference to FIG. 3.

Figure 3:
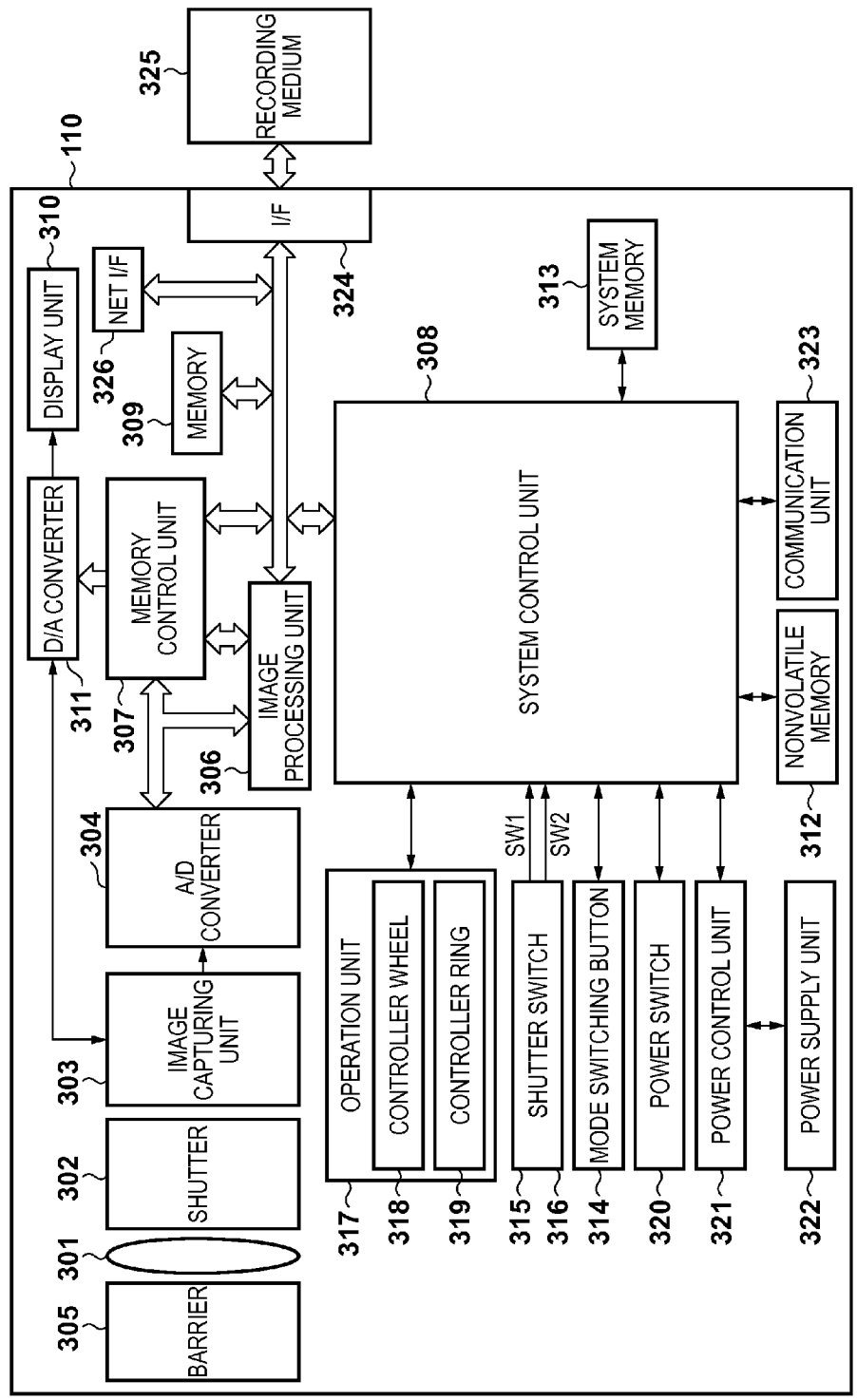
FIG. 3 is a block diagram showing an image capturing apparatus according to the embodiment.

As shown in FIG. 3, a photographing lens 301 includes a lens group of a zoom lens and a focusing lens. A shutter 302 has a diaphragm function. An image capturing unit 303 is an image sensor, which is constituted by a CCD or CMOS or the like, for converting the optical image of an object to an electric signal. An A/D converter 304 converts an analog signal to a digital signal. The A/D converter 304 is used to convert an analog signal, which is output from the image capturing unit 303, to a digital signal. A barrier 305 covers the image capturing system (which includes the photographing lens 301) of the image capturing apparatus 110, thereby preventing contamination of and damage to the image capturing system that includes the photographing lens 301, shutter 302 and image capturing unit 303.

An image processing unit 306 performs resizing processing, such as predetermined pixel interpolation and reduction, and color conversion processing, with respect to data from the A/D converter 304 or data from a memory control unit 307. Further, the image processing unit 306 performs predetermined calculation processing using the captured image data, and a system control unit 308 performs exposure control and distance measuring control based on the calculation results.

The data output from the A/D converter 304 is directly written into a memory 309 via both the image processing unit 306 and the memory control unit 307 or via the memory control unit 307. The memory 309 stores the image data obtained from the image capturing unit 303 and converted into digital data by the A/D converter 304, and image data to be displayed on a display unit 310. The memory 309 has a storage capacity that is sufficient for storing a predetermined number of still images as well as moving-images and audio for a predetermined time period.

The memory 309 also functions as a memory for image display (video memory). A D/A converter 311 converts the image display data stored in the memory 309 into an analog signal and supplies the analog signal with the display unit 310. In this manner, the image display data that was written into the memory 309 is displayed by the display unit 310 via the D/A converter 311. The display unit 310 performs, on a display device such as an LCD, display in accordance with the analog signal from the D/A converter 311. The digital signals converted by the A/D converter 304 and stored in the memory 309 are converted into analog signals by the D/A converter 311, and the analog signals are successively transmitted to the display unit 310 so as to be displayed thereon, making it possible to realize an electronic view finder (EVF) functionality and to perform through image display (live view display).

A nonvolatile memory 312 is, for example, an EEPROM, which is electrically erasable and recordable. In the nonvolatile memory 312, constants and programs, for example, for operating a system control unit 308 are stored. In this context, "programs" may refer to programs for executing various flowcharts that will be described later.

The system control unit 308 controls the entire image capturing apparatus 110, and realizes, by executing the programs stored in the nonvolatile memory 312, the procedures of the flowchart that will be described later. A system memory 313 is, for example, a RAM and used also as a work memory where constants and variables for operating the system control unit 308, and the programs read out from the nonvolatile memory 312 are expanded. The system control unit 308 controls the memory 309, the D/A converter 311, the display unit 310, and the like, so as to perform display control.

A mode switching button 314, a first shutter switch 315, a second shutter switch 316, and operation units 317 are operation members for inputting various types of instructions into the system control unit 308.

The mode switching button 314 switches the operation mode of the system control unit 308 to any of a still image recording mode, a moving-image recording mode, and a reproduction mode.

While the shutter button provided on the image capturing apparatus 110 is being operated, that is, pressed half-way (the shooting preparation instruction), the first shutter switch 315 is turned on and generates a first shutter switch signal SW1. Upon receiving the first shutter switch signal SW1, the system control unit 308 starts the AF (Automatic Focus) processing, the AE (Automatic Exposure) processing, the AWB (Automatic White Balance) processing, the EF (flash pre-emission) processing and the like.

When the operation of the shutter button is completed, that is, the shutter button is pressed fully (the shooting instruction), the second shutter switch 316 is turned on and generates a second shutter switch signal SW2. Upon receiving the second shutter switch signal SW2, the system control unit 308 starts a series of shooting processing from reading out the signal from the image capturing unit 303 to writing of image data to a recording medium 325.

By selecting various functional icons displayed on the display unit 310, appropriate functions for each situation are assigned to each operation member of the operation units 317, and the operation units 317 thus act as various function buttons. Examples of these function buttons include an execution button, an end button, a back button, an image scrolling button, a jump button, a narrow-down button, an attribute change button. For example, a menu screen that enables various settings to be made is displayed on the display unit 310 by pressing a menu button. The user can make various settings intuitively by using the menu screen, which is displayed on the display unit 310, four-direction (up, down, left, right) buttons and a SET button.

Included among the operation units 317 is also a touch panel as a touch detecting unit capable of detecting a touch operation on the display unit 310.

Further, the operation units 317 include a controller wheel 318 and a controller ring 319 which are rotatable operation members.

The controller wheel 318 is used together with the direction buttons as when a selection item is specified. When the controller wheel 318 is turned, an electrical pulse signal is generated in accordance with the amount of rotation, and the system control unit 308 controls each unit of the image capturing apparatus 110 based upon the pulse signal. The angle through which the controller wheel 318 has been turned and how many times it has been turned can be determined by the pulse signal. It should be noted that the controller wheel 318 can be any operating member so long as it is an operating member whose rotation can be detected. For example, it can be a dial operating member in which the controller wheel 318 per se is rotated to generate the pulse signal in accordance with a turning operation by the user. Further, it can be a device (a so-called touch wheel) that detects an operation such as the revolution of the user's finger on the controller wheel 318 without by the controller wheel 318 itself being rotated.

The controller ring 319 is an operation member around a lens barrel, that is rotatable about an optical axis. When the controller ring 319 is operated, an electrical pulse signal corresponding to an amount of rotation (an amount of operation) is generated. The system control unit 308 controls each unit of the image capturing apparatus 110 based on the pulse signal. When the function switching button of the controller ring 319 is pressed, a menu screen for allowing the user to change a function assigned to the controller ring 319 is displayed on the display unit 310. The controller ring 319 and the controller wheel 318 are used to select a normal mode item and change a value.

A power switch 320 switches between power on and power off of the image capturing apparatus 110.

A power control unit 321 is constituted by, for example, a battery detection circuit, a DC-DC converter, a switch circuit for changing over the block to be supplied with power, and detects a battery has been inserted or not, the type of the battery, and the residual capacity thereof. Further, the power control unit 321 controls the DC-DC converter in accordance with the detection results and an instruction of the system control unit 308, and supplies a necessary voltage for a necessary length of time to each of the units including the recording medium 325.

A power supply unit 322 comprises a primary battery such as an alkaline battery or a lithium battery, a secondary battery such as a NiCd battery, a NiMH battery, or a Li ion battery, or an AC adaptor.

A recording medium interface (I/F) 324 is for interfacing with the recording medium 325 such as the memory card or hard disk. The recording medium 325 is a recording medium such as a memory card for recording shot images, and constituted by a semiconductor memory, a magnetic disk, or the like.

A communication unit 323 transmits/receives a video and audio to/from an external apparatus communicably connected by a wireless antenna or wired cable.

A network I/F 326 can be connected to the network 104 such as a wireless LAN or the Internet, and can transmit, to an external apparatus, an image (including a through image) captured by the image capturing unit 303 and an image file recorded in the recording medium 325, and receive image data and other various kinds of information from an external apparatus.

Note that examples of the external apparatus are the first communication apparatus 102A, second communication apparatus 102B, and setting apparatus 105.

<Data Structure of Management Information> The data structure of management information issued by the setting apparatus 105 and recorded in the image capturing apparatus 110 and the communication apparatuses 102A and 102B according to this embodiment will be described with reference to FIGS. 4A and 4B.

Figure 4A:
FIGS. 4A to 4E are views exemplifying the data structure of management information according to the embodiment.

Referring to FIG. 4A, reference numeral 401 denotes an apparatus ID for uniquely specifying the image capturing apparatus 110, which is, for example, identification information such as a physical address; and 402, a management ID used to manage a service use ID 413 for uniquely identifying the service to be used by the image capturing apparatus 110. The pieces of management information are stored in the ROMs 207 and 227 and storage devices 209 and 229 of the setting apparatus 105 and communication apparatuses 102A and 102B, and the nonvolatile memory 312 of the image capturing apparatus 110.

Figure 4B:

Note that as shown in FIG. 4B, the service use ID 413 of the image capturing apparatus 110 holding a management ID 412 is registered as management information in the setting apparatus 105 in association with the management ID 412. The service use ID 413 is registered in association with service-related information about the service to be used by the image capturing apparatus 110 holding the management ID 412. The service-related information includes a name for uniquely identifying a site as the transfer destination of an image from the image capturing apparatus 110, the account information of the site, a mail address, and a password for using the management ID.

<Issuance/Acquisition/Recording of Management Information> Processing in which the communication apparatus 102A or 102B acquires management information from the image capturing apparatus 110 or setting apparatus 105, and records the management information will be described with reference to FIGS. 5A to 5C.

Figure 5A:
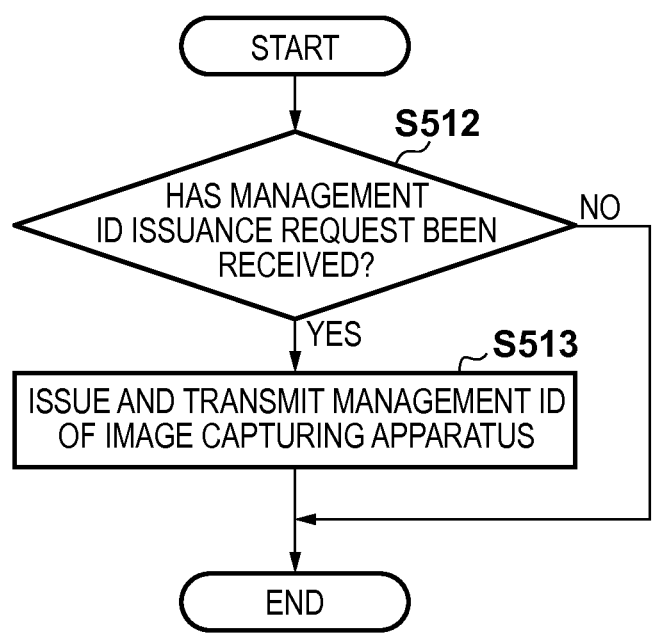

FIG. 5A shows the operation of the setting apparatus 105. FIG. 5B shows the operation of the communication apparatus 102A or 102B. FIG. 5C shows the operation of the image capturing apparatus 110. Assume that processing shown in FIG. 5B is executed by the first communication apparatus 102A.

Figure 5B:
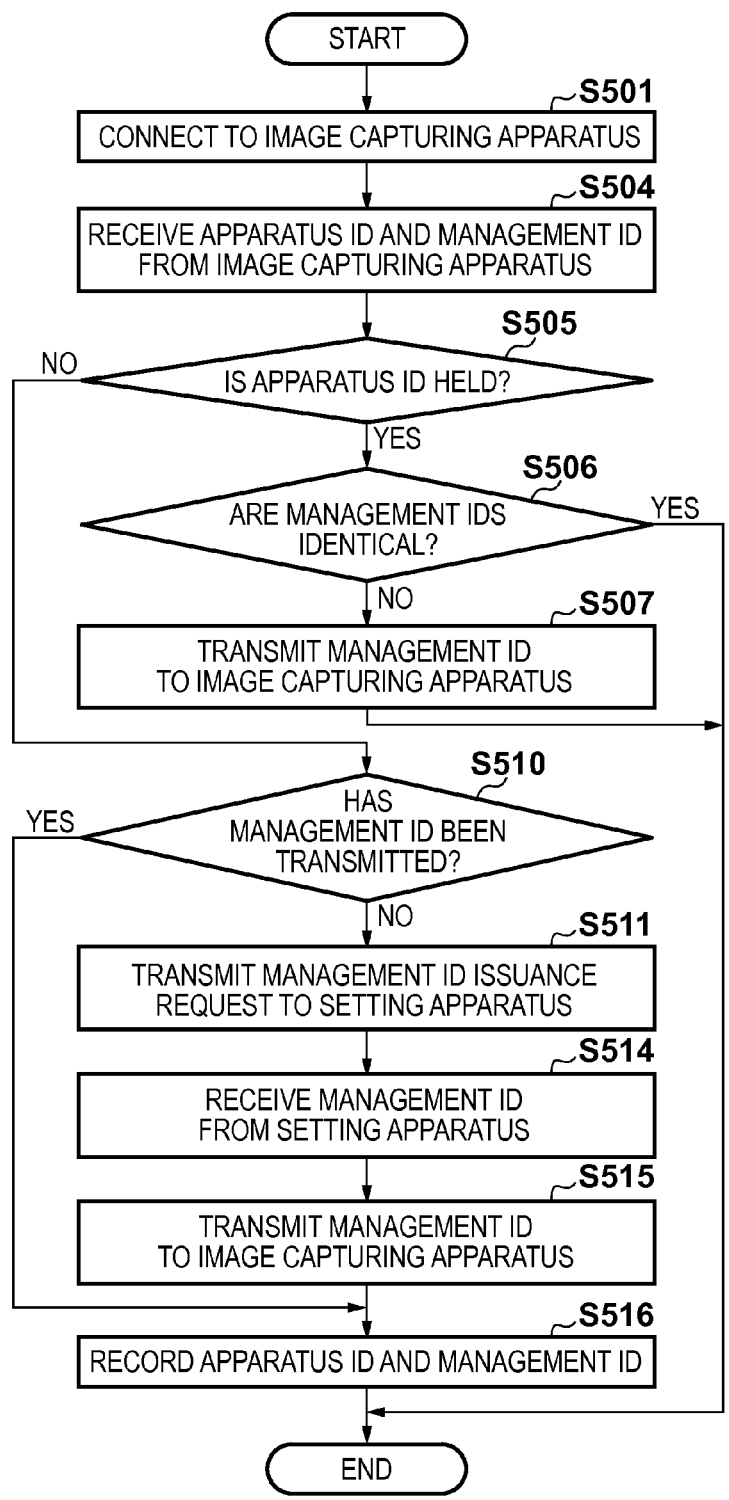

Note that processes shown in FIGS. 5A and 5B are implemented when the control units 206 and 226 of the setting apparatus 105 and first communication apparatus 102A execute programs stored in the ROMs 207 and 227 and the storage devices 209 and 229, and control the above-described respective units, respectively. Processing shown in FIG. 5C is implemented when the system control unit 308 of the image capturing apparatus 110 executes programs stored in the nonvolatile memory 312, and controls the above-described respective units.

In step S501, the first communication apparatus 102A establishes wired or wireless connection with the image capturing apparatus 110 for which service use settings are to be made.

In step S502, the image capturing apparatus 110 starts communicating with the first communication apparatus 102A.

In step S503, if an apparatus ID and management ID have been recorded, the image capturing apparatus 110 transmits the IDs to the first communication apparatus 102A.

In step S504, the first communication apparatus 102A receives the apparatus ID and management ID transmitted from the image capturing apparatus 110.

In step S505, the first communication apparatus 102A confirms whether an apparatus ID is held. If an apparatus ID is held, the process advances to step S506; otherwise, the process advances to step S510.

In step S506, the first communication apparatus 102A compares a management ID associated with the held apparatus ID with the management ID received from the image capturing apparatus 110, and determines whether the management IDs are identical. If it is determined that the management IDs are identical, the process ends; otherwise, the process advances to step S507.

In step S507, the first communication apparatus 102A transmits the management ID associated with the held apparatus ID to the image capturing apparatus 110, and terminates the process.

In step S508, the image capturing apparatus 110 determines whether the management ID transmitted by the first communication apparatus 102A in step S507 or S515 has been received. If the management ID has not been received, the process ends; otherwise, the process advances to step S509.

In step S509, the image capturing apparatus 110 records the management ID received from the first communication apparatus 102A, and terminates the process.

In step S510, the first communication apparatus 102A determines whether the management ID has been transmitted from the image capturing apparatus 110 in step S504. If the management ID has been transmitted, the process advances to step S516; otherwise, the process advances to step S511.

In step S511, the first communication apparatus 102A transmits, to the setting apparatus 105, an issuance request of a management ID corresponding to the apparatus ID received from the image capturing apparatus 110 in step S504.

In step S512, the setting apparatus 105 determines whether the management ID issuance request has been received from the first communication apparatus 102A. The management ID issuance request is transmitted from the first communication apparatus 102A together with the apparatus ID in step S511. If it is determined that no management ID issuance request has been received, the process ends; otherwise, the process advances to step S513.

In step S513, the setting apparatus 105 newly issues a management ID corresponding to the apparatus ID, and transmits the management ID to the first communication apparatus 102A, thereby terminating the process.

In step S514, the first communication apparatus 102A receives the newly issued management ID from the setting apparatus 105.

In step S515, the first communication apparatus 102A transmits, to the image capturing apparatus 110, the management ID received from the setting apparatus 105, and advances to step S516.

In step S516, the first communication apparatus 102A records, in the storage device 229, the apparatus ID and management ID received from the image capturing apparatus 110 in step S504 or the management ID received from the setting apparatus 105, thereby terminating the process.

In the above-described processing, the communication apparatus 102A or 102B can make service use settings of the image capturing apparatus 110 in the setting apparatus 105 without a UI (input of a password and the like) for performing user authentication.

Note that in this embodiment, if the management ID associated with the held apparatus ID is different from the management ID received from the image capturing apparatus 110 (NO in step S506), the communication apparatus 102A or 102B transmits the held apparatus ID to the image capturing apparatus 110 (step S507). The present invention, however, is not limited to this, and the communication apparatus 102A or 102B may save by overwrite the management ID received from the image capturing apparatus 110, instead of transmitting the management ID to the image capturing apparatus 110 in step S507. Alternatively, if the management ID associated with the held apparatus ID is different from the management ID received from the image capturing apparatus 110 (NO in step S506), the communication apparatus 102A or 102B may set which of the management IDs of the communication apparatus 102 and image capturing apparatus 110 is to be recorded, and make a selection according to the setting. With any of these methods, when the communication apparatus 102 is connected to the image capturing apparatus 110, the management ID of the communication apparatus 102A or 102B and that of the image capturing apparatus 110 can be synchronized with each other.

<Service Use Settings> Processing of making service use settings of the image capturing apparatus 110 in the setting apparatus 105 using the communication apparatus 102A or 102B will be described with reference to FIGS. 6A and 6B.

Figure 6A:
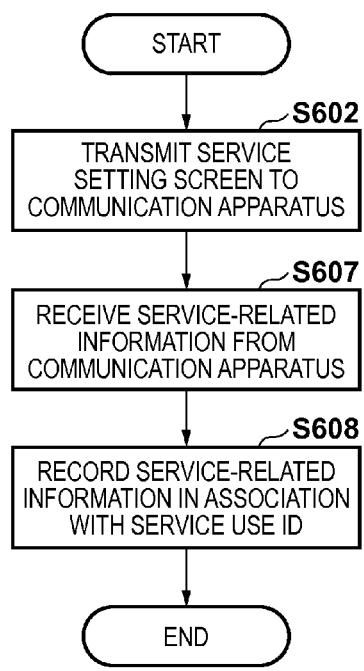
FIGS. 6A and 6B are flowcharts illustrating service use setting processing according to the first embodiment.

FIG. 6A shows the operation of the setting apparatus 105. FIG. 6B shows the operation of the communication apparatus 102A or 102B. Assume that processing shown in FIG. 6B is executed by the first communication apparatus 102A.

Figure 6B:
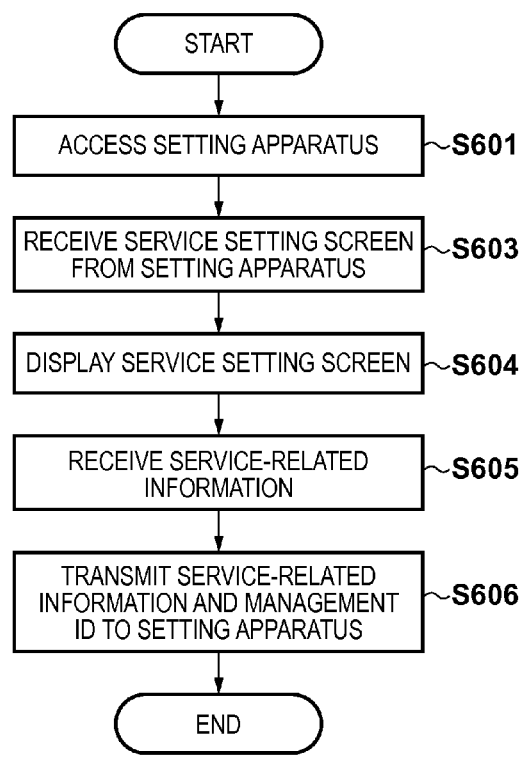

Note that processes shown in FIGS. 6A and 6B are implemented when the control units 206 and 226 of the setting apparatus 105 and the first communication apparatus 102A execute programs stored in the ROMs 207 and 227 and the storage devices 209 and 229, and control the above-described respective units, respectively.

In step S601, the Web browser of the first communication apparatus 102A is activated by a user operation to access the setting apparatus 105 via the network 104 based on a predetermined URL.

In step S602, the setting apparatus 105 transmits screen information for displaying a service setting screen to the first communication apparatus 102A, thereby permitting inputting service-related information.

In steps S603 and S604, the first communication apparatus 102A receives the screen information of the service setting screen from the setting apparatus 105, and displays the service setting screen on the display device 221.

In step S605, the first communication apparatus 102A receives service-related information by accepting a user operation on the service setting screen.

In step S606, the first communication apparatus 102A transmits, to the setting apparatus 105, the management ID read out from the ROM 227 or storage device 229 and the service-related information received in step S605.

In steps S607 and S608, the setting apparatus 105 receives the service-related information and the management ID from the first communication apparatus 102A, and registers them in association with the service use ID as management information.

In the service setting screen, it is possible to update existing service-related information in addition to input of new service-related information.

As described above, according to this embodiment, it is possible to quickly make service use settings of an apparatus for using a service by using a user terminal with a simple procedure.

[Second Embodiment] In the second embodiment, processing will be described, in which an application of a communication apparatus 102A or 102B communicates with a setting apparatus 105 and an image capturing apparatus 110, acquires management information from the image capturing apparatus 110 or the setting apparatus 105 based on the presence/absence of service use settings of the image capturing apparatus 110 and the use history of a management ID, and records the management information.

Note that the configuration of a system and the configuration of apparatuses forming the system according to this embodiment are the same as those in the first embodiment.

<Data Structure of Management Information> The data structure of management information which is issued by the setting apparatus 105 and recorded in the image capturing apparatus 110 and the communication apparatuses 102A and 102B will be explained with reference to FIGS. 4C to 4E.

Figure 4C:

FIG. 4C exemplifies the data structure of management information registered in the setting apparatus 105 according to the second embodiment. Reference numeral 403 denotes an application ID for uniquely specifying an application executed on the communication apparatus 102A or 102B; 404, an apparatus ID for uniquely specifying the image capturing apparatus 110; 405, a management ID for managing a service use ID for the image capturing apparatus 110; and 406, use status information for determining whether the management ID has been used. The pieces of management information are stored in a ROM 207 or storage device 209 of the setting apparatus 105.

Figure 4D:
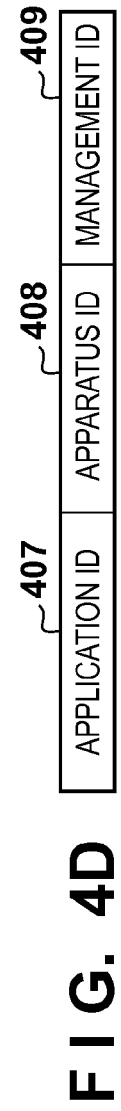

FIG. 4D exemplifies the data structure of management information recorded in the communication apparatus 102A or 102B according to the second embodiment. Reference numeral 407 denotes an application ID for uniquely specifying an application; 408, an apparatus ID for uniquely specifying the image capturing apparatus 110; and 409, a management ID for managing a service use ID for the image capturing apparatus 110.

Figure 4E:

FIG. 4E exemplifies the data structure of management information recorded in the image capturing apparatus 110 according to the second embodiment. Reference numeral 410 denotes an apparatus ID for uniquely identifying the image capturing apparatus 110; and 411, a management ID for managing a service use ID for the image capturing apparatus 110.

<Issuance/Acquisition/Recording of Management Information> Processing in which an application of the communication apparatus 102A or 102B acquires management information from the image capturing apparatus 110 or setting apparatus 105, and records the management information will be described with reference to FIGS. 7A to 7C.

FIG. 7A shows the operation of the setting apparatus 105. FIGS. 7B-1 and 7B-2 show the operation of the communication apparatus 102A or 102B. FIG. 7C shows the operation of the image capturing apparatus 110. Assume that processing shown in FIGS. 7B-1 and 7B-2 is executed by the first communication apparatus 102A. Note that the communication apparatus may be an apparatus which has made service use settings of the image capturing apparatus 110, or may be another apparatus.

Note that processes shown in FIGS. 7A to 7B-2 are implemented when control units 206 and 226 of the setting apparatus 105 and first communication apparatus 102A execute predetermined application programs, and control the above-described respective units, respectively. Processing shown in FIG. 7C is implemented when a system control unit 308 of the image capturing apparatus 110 executes programs stored in a nonvolatile memory 312, and control the above-described respective units.

Note that processes in steps S706 to S711 of FIGS. 7B-1 and 7C are the same as those in steps S501 to S506 of FIGS. 5B and 5C. Processes in steps S718 to S727 of FIGS. 7B-1 to 7C are the same as those in steps S507 to S516 of FIGS. 5B and 5C. The difference from FIGS. 5A to 5C will be mainly described below.

In step S701, the first communication apparatus 102A determines whether a predetermined application for making service use settings of the image capturing apparatus 110 in the setting apparatus 105 holds an application ID. If it is determined that the predetermined application holds an application ID, the process advances to step S706; otherwise, the process advances to step S702.

In step S702, the application of the first communication apparatus 102A transmits an application ID acquisition request to the setting apparatus 105.

In step S703, the setting apparatus 105 determines whether the application ID acquisition request has been received from the first communication apparatus 102A. If no application ID acquisition request has been received, the process advances to step S713; otherwise, the process advances to step S704.

In step S704, the setting apparatus 105 transmits an application ID to the first communication apparatus 102A, and advances to step S713.

In step S705, the application of the first communication apparatus 102A receives the application ID from the setting apparatus 105, and records the received application ID.

In step S706, the first communication apparatus 102A establishes wired or wireless connection with the image capturing apparatus 110 for which the predetermined application is to make service use settings.

In steps S707 and S708, the image capturing apparatus 110 starts communicating with the first communication apparatus 102A. If an apparatus ID and management ID have been recorded, the image capturing apparatus 110 transmits the IDs to the first communication apparatus 102A.

In steps S709 and S710, the application of the first communication apparatus 102A receives the apparatus ID and management ID from the image capturing apparatus 110, and determines whether an apparatus ID is held. If it is determined that an apparatus ID is held, the process advances to step S711; otherwise, the process advances to step S721.

In step S711, the application of the first communication apparatus 102A compares a management ID associated with the held apparatus ID with the management ID received from the image capturing apparatus 110 in step S709, and determines whether the management IDs are identical. If it is determined that the management IDs are identical, the process ends; otherwise, the process advances to step S712.

In step S712, the application of the first communication apparatus 102A transmits, to the setting apparatus 105, the held application ID and a use confirmation request of the management ID received from the image capturing apparatus 110 in step S709.

In step S713, the setting apparatus 105 determines whether the application ID and the management ID use confirmation request have been received from the first communication apparatus 102A. If the application ID and the management ID use confirmation request have not been received, the process advances to step S723; otherwise, the process advances to step S714.

In step S714, the setting apparatus 105 determines whether a management ID recorded in association with the application ID has been used, and transmits a determination result to the first communication apparatus 102A. Note that whether the management ID has been used can be determined based on a history such as password authentication using the application ID if service-related information such as a password and mail address has been set by past service use settings but other methods may be used.

In step S715, the application of the first communication apparatus 102A receives the management ID use confirmation result from the setting apparatus 105.

In step S716, based on the management ID use confirmation result received from the setting apparatus 105, the application of the first communication apparatus 102A determines whether the management ID has been used. If it is determined that the management ID has not been used, the process advances to step S717; otherwise, the process advances to step S718.

In step S717, the application of the first communication apparatus 102A initializes the held apparatus ID and the management ID (unused) to newly record a management ID in the image capturing apparatus 110. Note that deletion or another method is used as an initialization method.

In step S718, the application of the first communication apparatus 102A transmits the held management ID (which has been used) to the image capturing apparatus 110, and terminates the process.

In steps S719 and S720, if the management ID has been received from the first communication apparatus 102A in step S718 or S726, the image capturing apparatus 110 records the received management ID, and terminates the process.

After that, in steps S721 to S727, the same processes as those in steps S510 to S516 of FIG. 5B are executed. Note that a management ID issuance request transmitted from the application of the first communication apparatus 102A in step S722 is transmitted together with the application ID and apparatus ID.

In steps S723 and S724, the same processes as those in steps S512 and S513 of FIG. 5A are executed.

In the above-described processing, even an apparatus which has not made service use settings of the image capturing apparatus 110 can acquire management information from the image capturing apparatus 110 or setting apparatus 105 and record the management information without a UI (input of a password and the like) for performing user authentication.

<Service Use Settings> Processing of making service use settings of the image capturing apparatus 110 in the setting apparatus 105 using the communication apparatus 102A or 102B will be described with reference to FIGS. 8A and 8B.

FIG. 8A shows the operation of the communication apparatus 102A or 102B. FIG. 8B shows the operation of the setting apparatus 105. Assume that processing shown in FIG. 8A is executed by the first communication apparatus 102A. Note that the communication apparatus may be an apparatus which has made service use settings of the image capturing apparatus 110, or may be another apparatus.

Note that processes shown in FIGS. 8A and 8B are implemented when the control units 206 and 226 of the setting apparatus 105 and the first communication apparatus 102A execute programs stored in the ROM 207 storage device 209 and a ROM 227 and storage device 229, and control the above-described respective units, respectively.

In step S801, the first communication apparatus 102A transmits the management ID to the setting apparatus 105. In step S802, the setting apparatus 105 receives the management ID from the first communication apparatus 102A.

In steps S803, S804, and S805, the setting apparatus 105 searches for service use IDs based on the management ID received from the first communication apparatus 102A, generates a list, and transmits the list to the first communication apparatus 102A.

In steps S806 and S807, the first communication apparatus 102A receives the list of service use IDs from the setting apparatus 105, and displays a list of icons corresponding to the service use IDs on the display device 201.

The user can activate an application by selecting a desired one of the icons displayed on the first communication apparatus 102A, and acquire service-related information associated with the management ID from the setting apparatus 105.

As described above, according to this embodiment, it is possible to quickly make service use settings of an apparatus for using a service by using the communication apparatus of the user with a simple procedure.

Furthermore, even an apparatus other than a communication apparatus which has made service use settings can quickly make service use settings with a simple procedure.

[Third Embodiment] A configuration will be described in which when a communication apparatus 102A or 102B which has made service use settings or an image capturing apparatus 110 for using a service is lost or transferred, a management ID registered in a setting apparatus 105 is forcibly set in a use stop state.

In this embodiment, when making service use settings of the image capturing apparatus 110, service use stop information is recorded in the communication apparatus 102A or 102B. Even after the image capturing apparatus 110 is lost or transferred, it is possible to stop the use of a network service by the image capturing apparatus 110.

Note that pieces of management information such as a management ID, an apparatus ID, a service use ID, service use stop information are registered in the setting apparatus 105.

Note that the configuration of a system and the configuration of apparatuses forming the system according to this embodiment are the same as those in the first embodiment.

<Issuance/Acquisition/Recording of Management Information> Processing in which the communication apparatus 102A or 102B acquires service use stop information from the image capturing apparatus 110 or setting apparatus 105, and records the information will be described with reference to FIGS. 9A to 9C.

FIG. 9A shows the operation of the image capturing apparatus 110. FIG. 9B shows the operation of the communication apparatus 102A or 102B. FIG. 9C shows the operation of the setting apparatus 105. Assume that processing shown in FIG. 9B is executed by the first communication apparatus 102A.

Note that the communication apparatus may be an apparatus which has made service use settings of the image capturing apparatus 110, or may be another apparatus.

Note that processing shown in FIG. 9A is implemented when a system control unit 308 of the image capturing apparatus 110 executes programs stored in a nonvolatile memory 312, and controls the above-described respective units. Note also that processes shown in FIGS. 9B and 9C are implemented when control units 206 and 226 of the setting apparatus 105 and first communication apparatus 102A execute programs stored in ROMs 207 and 227 and storage devices 209 and 229, and control the above-described respective units, respectively.

In step S901, the image capturing apparatus 110 transmits an apparatus ID to the first communication apparatus 102A.

In steps S902 and S903, the first communication apparatus 102A receives the apparatus ID from the image capturing apparatus 110, and transmits a management ID issuance request to the setting apparatus 105. The management ID issuance request contains the apparatus ID of the image capturing apparatus 110 received in step S902.

In steps S904 and S905, the setting apparatus 105 receives the management ID issuance request transmitted by the first communication apparatus 102A, and generates a new management ID and service use stop information.

In step S906, the setting apparatus 105 registers, as management information, in association with each other, the apparatus ID of the image capturing apparatus 110 contained in the management ID issuance request received in step S904, and the management ID and service use stop information which have been generated in step S905.

In step S907, the setting apparatus 105 transmits the management ID and service use stop information to the first communication apparatus 102A.

In steps S908, S909, S910, the first communication apparatus 102A receives the management ID and service use stop information from the setting apparatus 105, records the service use stop information, and transmits the management ID to the image capturing apparatus 110.

In steps S911 and S912, the image capturing apparatus 110 receives the management ID from the first communication apparatus 102A, and records the received management ID.

As described above, according to this embodiment, the management ID is recorded in the image capturing apparatus 110, the service use stop information is recorded in the first communication apparatus 102A, and the apparatus ID, management ID, and service use stop information are registered as the management information in association with each other in the setting apparatus 105. It is possible to stop the use of the network service by the image capturing apparatus 110 by performing service use stop processing (to be described later).

Note that if a management ID issuance request for an existing apparatus ID is received, the setting apparatus 105 deletes a corresponding record from the management information, and issues a new management ID. This makes it possible to disable existing settings and make settings again for an image capturing apparatus for which service use settings have already been made.

Figures 10, 11:
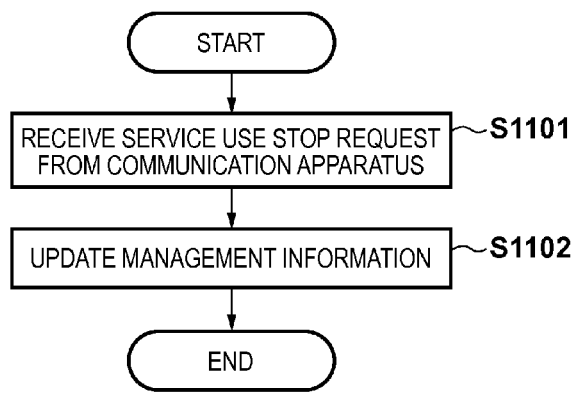
FIG. 10 is a table exemplifying the data structure of management information according to the third embodiment.
FIG. 11 is a flowchart illustrating service use stop processing according to the third embodiment.

FIG. 10 shows the management information registered in the setting apparatus 105 by making service use settings. Reference numeral 1001 denotes a management ID; 1002, an apparatus ID; and 1003, a service use stop information. By making service use settings, these pieces of information are associated with each other, and registered as one record.

<Service Use Stop Processing> Service use stop processing according to this embodiment will be described with reference to FIG. 11.

The service use stop processing is executed by the setting apparatus 105 when the communication apparatus 102A or 102B transmits a service use stop request to the setting apparatus 105 by a user operation, and the setting apparatus 105 receives the service use stop request from the communication apparatus 102A or 102B. Assume that the first communication apparatus 102A executes the processing.

Note that the communication apparatus may be an apparatus which has made service use settings of the image capturing apparatus 110 or may be another apparatus, but is a communication apparatus which holds service use stop information.

Processing shown in FIG. 11 is implemented when the control unit 206 of the setting apparatus 105 executes programs stored in the ROM 207 and storage device 209, and controls the above-described respective units.

In step S1101, the setting apparatus 105 receives a service use stop request from the first communication apparatus 102A. The service use stop request contains service use stop information.

In step S1102, the setting apparatus 105 updates the management information. In this case, the setting apparatus 105 deletes, from the management information, the record of a stop target management ID based on the service use stop information.

As described above, the setting apparatus 105 deletes, from the management information, the record of the management ID for which the use of the service has been stopped. A communication apparatus which holds service use stop information can execute this service use stop processing. Therefore, even if an image capturing apparatus which has made service use settings is lost or transferred, it is possible to execute the service use stop processing.

<Service Use Permission/Inhibition Determination Processing> Service use permission/inhibition determination processing according to this embodiment will be described with reference to FIG. 12.

The service use permission/inhibition determination processing is executed when the image capturing apparatus 110 uses the service. The setting apparatus 105 directly communicates with the image capturing apparatus 110, determines permission/inhibition of the use of the service in response to a service use request from the image capturing apparatus 110, and inhibits the use of the service by the image capturing apparatus 110 for which it has been determined that a management ID is invalid.

Figures 12, 13:
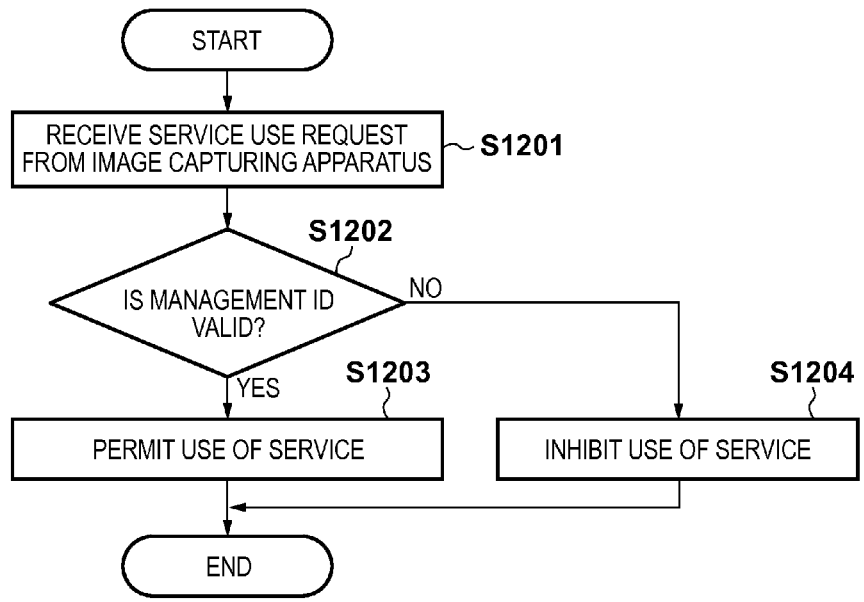
FIG. 12 is a flowchart illustrating service use permission/inhibition determination processing according to the third embodiment.
FIG. 13 is a table exemplifying the data structure of management information according to the fourth embodiment.

Note that processing shown in FIG. 12 is implemented when the control unit 206 of the setting apparatus 105 executes the programs stored in the ROM 207 and storage device 209, and controls the above-described respective units.

In step S1201, the setting apparatus 105 receives a service use request from the image capturing apparatus 110. The service use request contains a management ID.

In step S1202, the setting apparatus 105 determines the validity of the management ID. The validity of the management ID is determined based on whether the management ID as a determination target exists in the management information of the setting apparatus 105. If it is determined that the management ID exists, the process advances to step S1203, and the setting apparatus 105 permits the use of the service. On the other hand, if the management ID does not exist, the process advances to step S1204, the setting apparatus 105 inhibits the use of the service.

As described above, the setting apparatus 105 determines permission/inhibition of the use of the service in response to a service use request from the image capturing apparatus 110, and inhibits the use of the service by the image capturing apparatus 110 for which it has been determined that the management ID is invalid.

As described above, according to this embodiment, even if the communication apparatus which has made service use settings or the image capturing apparatus for using a service is lost or transferred, a management ID registered in the setting apparatus for providing the service is forcibly set in a use stop state. With this processing, in the embodiment, it is possible to stop the use of the network service by the apparatus which has been lost or transferred, without performing user authentication and the like, thereby preventing unauthorized use of the service.

Note that in this embodiment, the management ID and service use stop information of FIG. 10 have been explained as different pieces of information but may be the same information.

Furthermore, in this embodiment, the communication apparatus 102A or 102B transmits a service use stop request. However, service use stop information held in the communication apparatus 102A or 102B may be copied to another apparatus to transmit a service use stop request.

Fourth Embodiment In the fourth embodiment, a configuration in which the service use stop state set according to the third embodiment is canceled to resume the use of the service will be described.

In this embodiment, service use stop information indicates the URL of a Web page. A communication apparatus 102A or 102B identifiably presents the result of determining permission/inhibition of the use of the service. Furthermore, the communication apparatus 102A or 102B can issue a service use resumption request to a setting apparatus 105 with respect to an image capturing apparatus 110 for which a service use stop request has been issued.

Note that the configuration of a system and the configuration of apparatuses forming the system according to this embodiment are the same as those in the first embodiment. Service use stop processing according to this embodiment is also the same as that in the third embodiment.

FIG. 13 shows management information registered in the setting apparatus 105 by making service use settings. Reference numeral 1301 denotes a management ID; 1302, an apparatus ID; 1303, service use stop information which indicates the URL of a Web page for stopping the use; and 1304, use stop date/time information. The use stop date/time information 1304 is null at the time of making service use settings. When the use of a management ID is stopped, the use stop date/time is registered in the use stop date/time information 1304. By referring to the use stop date/time information 1304, the setting apparatus 105 can determine whether a received management ID 1301 is in a use stop state. As for a management ID the use of which has been stopped, the setting apparatus 105 deletes a corresponding record from the management information when a predetermined period elapses after the use is stopped.

<Service Use Stop Processing> Service use stop processing according to this embodiment will be described with reference to FIGS. 14A and 14B.

The service use stop processing is executed by the setting apparatus 105 when the use of the service is stopped via the communication apparatus 102A or 102B by a user operation, and the setting apparatus 105 receives a service use stop request from the communication apparatus 102A or 102B.

Figure 14A:
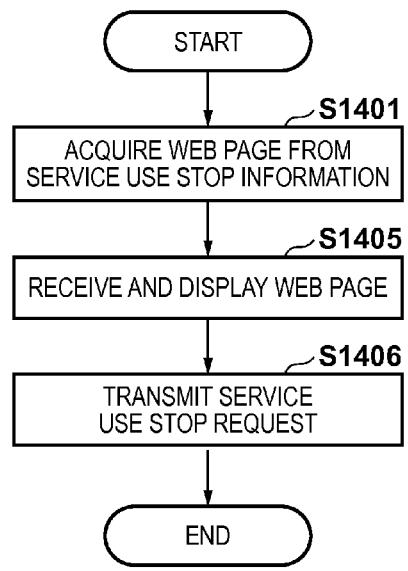
FIGS. 14A to 14B are flowcharts illustrating service use stop processing according to the fourth embodiment.

FIG. 14A shows the operation of the communication apparatus 102A or 102B. FIG. 14B shows the operation of the setting apparatus 105. Assume that processing shown in FIG. 14A is executed by the first communication apparatus 102A. Note that the communication apparatus may be an apparatus which has made service use settings of the image capturing apparatus 110 or may be another apparatus, but is a communication apparatus which holds service use stop information.

Figure 14B:
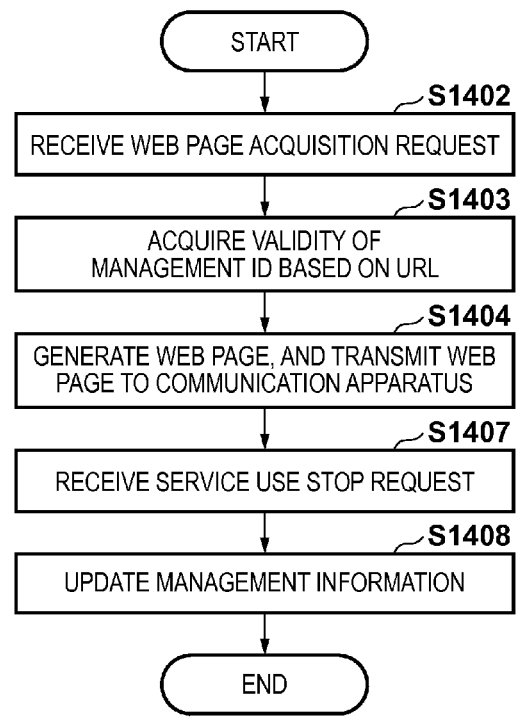

Note that processes shown in FIGS. 14A and 14B are implemented when control units 206 and 226 of the setting apparatus 105 and first communication apparatus 102A execute programs stored in ROMs 207 and 227 and storage devices 209 and 229, and control the above-described respective units, respectively.

In step S1401, based on the URL of a Web page as service use stop information stored when making service use settings, the first communication apparatus 102A acquires the Web page for stopping the use.

In step S1402, the setting apparatus 105 receives a Web page acquisition request from the first communication apparatus 102A. The Web page acquisition request contains the URL as the service use stop information.

In step S1403, the setting apparatus 105 refers to the management information based on the URL for stopping the use of the service, which has been received from the first communication apparatus 102A, and determines the validity of the management ID. As for determination of the validity of the management ID, if the determination target management ID exists in the management information of the setting apparatus 105 and the use stop date/time of the management ID is null, it is determined that the management ID is valid.

In step S1404, the setting apparatus 105 generates a Web page indicating the validity of the management ID, and transmits the generated Web page to the first communication apparatus 102A. If the management ID is valid, the generated Web page includes a button for executing a use stop operation. On the other hand, if the management ID is invalid, that is, if the management ID does not exist in the management information of the setting apparatus 105 or the use of the management ID has already been stopped, the Web page includes a button for executing a use resumption operation.

In step S1405, the first communication apparatus 102A receives the Web page from the setting apparatus 105, and displays the received Web page on a display device 201. This processing allows the user of the first communication apparatus 102A to confirm permission/inhibition of the use of the service.

Step S1406 and subsequent steps correspond to processing of executing a service use stop operation, and the first communication apparatus 102A transmits a service use stop request to the setting apparatus 105. This processing is executed when the user of the first communication apparatus 102A presses the button for executing the use stop operation, which is included in the Web page. The service use stop request contains information for specifying the stop target management ID. This information may be the management ID itself, or other information such as the URL of the Web page.

In step S1407, the setting apparatus 105 receives the service use stop request from the first communication apparatus 102A.

In step S1408, the setting apparatus 105 updates the management information. At this time, the setting apparatus 105 specifies the stop target management ID based on the service use stop request, and registers the use stop date/time of the management ID.

After that, the service use permission/inhibition determination processing described with reference to FIG. 12 is executed. In this embodiment, however, in the processing of determining the validity of the management ID in step S1202, if the determination target management ID exists in the management information and the use of the management ID has not been stopped, it is determined that the management ID is valid.

<Service Use Resumption Processing> Service use resumption processing according to this embodiment will be described with reference to FIGS. 15A and 15B.

The service use resumption processing is executed by the setting apparatus 105 when the communication apparatus 102A or 102B issues a service use resumption request to the setting apparatus 105 by a user operation, and the setting apparatus 105 receives the service use resumption request from the communication apparatus 102A or 102B.

Figure 15A:
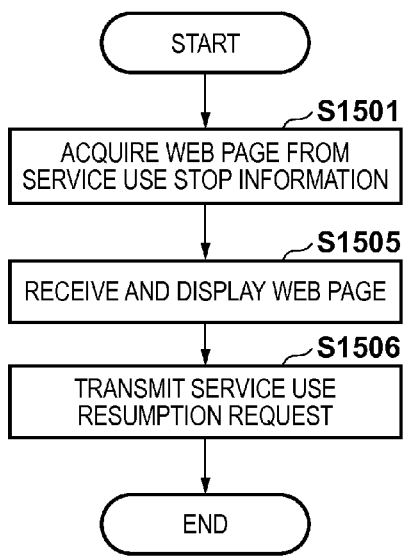
FIGS. 15A to 15B are flowcharts illustrating service use resumption processing according to the fourth embodiment.

FIG. 15A shows the operation of the communication apparatus 102A or 102B. FIG. 15B shows the operation of the setting apparatus 105. Assume that processing shown in FIG. 15A is executed by the first communication apparatus 102A. Note that the communication apparatus may be an apparatus which has made service use settings of the image capturing apparatus 110 or may be another apparatus, but is a communication apparatus which holds service use stop information.

Figure 15B:
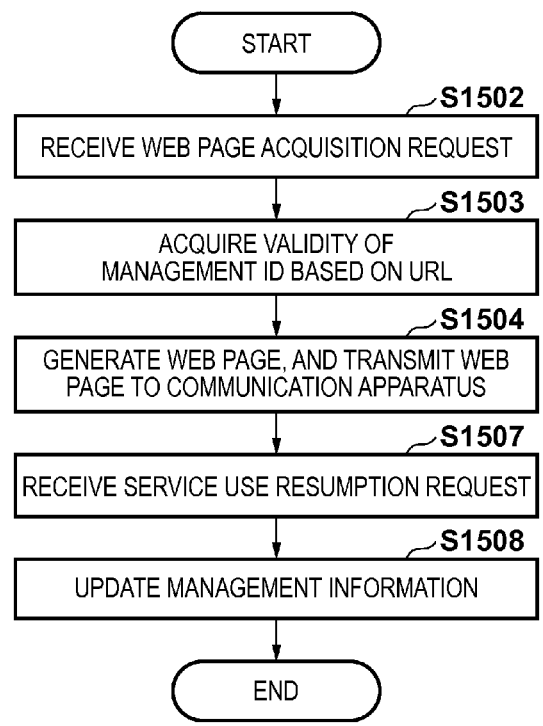

Note that processes shown in FIGS. 15A and 15B are implemented when the control units 206 and 226 of the setting apparatus 105 and first communication apparatus 102A execute programs stored in the ROMs 207 and 227 and the storage devices 209 and 229, and control the above-described respective units.

Note that processes in steps S1501, S1502, S1503, S1504, and S1505 of FIGS. 15A and 15B are the same as those in steps S1401, S1402, S1403, S1404, and S1405 of FIGS. 14A and 14B. The difference from FIGS. 14A and 14B will be mainly described below.

Step S1506 and subsequent steps correspond to processing of executing a service use resumption operation, and the first communication apparatus 102A transmits a service use resumption request to the setting apparatus 105. This processing is executed when the user of the first communication apparatus 102A presses the button for executing the use resumption operation, which is included in the Web page. The service use resumption request contains information for specifying a resumption target management ID. This information may be the management ID itself, or other information such as the URL of the Web page.

In step S1507, the setting apparatus 105 receives the service use resumption request from the first communication apparatus 102A.

In step S1508, the setting apparatus 105 updates the management information. At this time, the setting apparatus 105 specifies the resumption target management ID based on the service use resumption request, and nullifies the use stop date/time of the management ID.

Note that if the resumption target management ID has been deleted from the management information of the setting apparatus 105 since, for example, the use resumption period has expired, the setting apparatus 105 generates a new record in the management information to register the management ID contained in the service use resumption request, the service use stop information, and the apparatus ID. This makes it possible to use the management ID again.

As described above, according to this embodiment, it is possible to resume the management ID for which the use of the service has been stopped.

Note that instead of making it possible to use again a management ID whose use resumption period has expired, as described above, the communication apparatus may be notified that the use resumption period has expired. Alternatively, instead of providing the use resumption period, the record of the management ID for which the use of the service has been stopped may remain without being deleted.

As described above, according to this embodiment, it is possible to stop the use of a network service by an apparatus which has been lost or transferred, without associating user information with an apparatus for using the service. It is also possible to resume the use of the service with respect to the apparatus for which the use of the service has been stopped.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-258700, filed Dec. 13, 2013 which is hereby incorporated by reference herein in its entirety.

What is claimed is:

1. A system in which a first communication apparatus for using a service, a second communication apparatus for making settings about the service to be used by the first communication apparatus, and an information processing apparatus for providing the service are communicably connected, wherein the first communication apparatus comprises:
a communication unit configured to communicate with the second communication apparatus;
a transmission unit configured to transmit, among identification information of the first communication apparatus and management information about the settings of the service to be used by the first communication apparatus, at least the identification information to the second communication apparatus; and a recording unit configured to record management information received from the second communication apparatus, wherein the second communication apparatus comprises:

a first transmission unit configured to, if the management information has been received from the first communication apparatus, compare the management information with management information recorded in the second communication apparatus, and if the management information acquired from the first communication apparatus is different, transmit the management information recorded in the second communication apparatus to the first communication apparatus;

a second transmission unit configured to, if the management information has not been received from the first communication apparatus, transmit an issuance request of management information to the information processing apparatus, and transmit, to the first communication apparatus, the management information which has been received from the information processing apparatus in response to the issuance request of the management information; and a recording unit configured to record the management information transmitted to the first communication apparatus and the identification information acquired from the first communication apparatus in association with each other, and wherein the information processing apparatus comprises:

a communication unit configured to communicate with the second communication apparatus; and a first transmission unit configured to generate the management information and transmit the management information to the second communication apparatus in response to the issuance request of the management information received from the second communication apparatus.

2. A second communication apparatus which is communicably connected to a first communication apparatus for using a service, and an information processing apparatus for providing the service, and makes settings about the service to be used by the first communication apparatus, comprising:

a request unit configured to transmit, to the information processing apparatus, an issuance request of management information about the settings of the service to be used by the first communication apparatus;

a reception unit configured to receive the management information from the information processing apparatus in response to the issuance request of the management information;

a recording unit configured to record, in a storage unit, the management information received by the reception unit;

an acquisition unit configured to acquire, among identification information of the first communication apparatus and management information about the settings of the service to be used by the first communication apparatus, at least the identification information from the first communication apparatus; and a transmission unit configured to transmit, to the first communication apparatus, the management information which is received by the reception unit from the information processing apparatus in response to the issuance request of the management information which is transmitted by the request unit to the information processing apparatus if the management information is not acquired from the first communication apparatus and the management information is not recorded in the recording unit, wherein the recording unit records the management information transmitted to the first communication apparatus and the identification information acquired from the first communication apparatus in association with each other.

3. The apparatus according to claim 2, further comprising:

a comparison unit configured to, if the management information is recorded in the recording unit of the second communication apparatus when the management information is acquired from the first communication apparatus, compare the acquired management information with the recorded management information, wherein if the management information recorded in the recording unit of the second communication apparatus is different from the management information acquired from the first communication apparatus, the transmission unit transmits the management information recorded in the recording unit of the second communication apparatus to the first communication apparatus.

4. The apparatus according to claim 2, further comprising:

a comparison unit configured to, if the management information is recorded in the recording unit of the second communication apparatus when the management information is acquired from the first communication apparatus, compare the acquired management information with the recorded management information, wherein if the management information recorded in the recording unit of the second communication apparatus is different from the management information acquired from the first communication apparatus, the recording unit saves by overwrite the management information acquired from the first communication apparatus.

5. The apparatus according to claim 2, further comprising:

a comparison unit configured to, if the management information is recorded in the recording unit of the second communication apparatus when the management information is acquired from the first communication apparatus, compare the acquired management information with the recorded management information; and an inquiry unit configured to, if the management information recorded in the recording unit of the second communication apparatus is different from the management information acquired from the first communication apparatus, inquire of the information processing apparatus a use history of the management information acquired from the first communication apparatus, wherein if a reply indicating that there is no use history is accepted from the information processing apparatus in response to the inquiry, the transmission unit transmits the management information which is received by the reception unit from the information processing apparatus in response to the issuance request of the management information which is transmitted by the request unit to the information processing apparatus.

6. The apparatus according to claim 2, further comprising:

an input unit configured to input service-related information about the service; and a second transmission unit configured to transmit the service-related information and the management information to the information processing apparatus.

7. The apparatus according to claim 2, further comprising:

a stop request unit configured to issue, to the information processing apparatus, a service use stop request to stop use of the service used by the first communication apparatus; and a unit configured to record service use stop information acquired from the information processing apparatus, and the identification information and the management information of the first communication apparatus as a stop target.

8. The apparatus according to claim 7, wherein
the service use stop information is registered in the management information in association with the identification information of the first communication apparatus and a use stop date/time, and
when the use of the service is stopped, the use stop date/time is registered.

9. The apparatus according to claim 7, further comprising:
a resumption request unit configured to request the information processing apparatus to resume the use of the service for which the use by the first communication apparatus has been stopped with respect to the service for which the use by the first communication apparatus has been stopped.

10. The apparatus according to claim 9, wherein
the service use stop information indicates a URL of a Web page, and
the request to stop or resume the use of the service is issued by pressing a button for stopping or resuming the use, which is included in the Web page.

11. An information processing apparatus for providing a service to be used by a first communication apparatus, comprising:
a communication unit configured to communicate with a second communication apparatus for making settings about the service to be used by the first communication apparatus;
a first reception unit configured to receive an issuance request of management information from the second communication apparatus;
a transmission unit configured to generate the management information and transmit the management information to the second communication apparatus in response to the issuance request of the management information received from the second communication apparatus;
a second reception unit configured to receive, from the second communication apparatus, the management information and service-related information set about the service; and
a storing unit configured to store the service-related information and the management information in association with each other.

12. A first communication apparatus for using a service provided by an information processing apparatus, comprising:
a communication unit configured to communicate with a second communication apparatus configured to make settings about the service to be used by the first communication apparatus;
a first transmission unit configured to transmit, among identification information of the first communication apparatus and management information about the settings of the service to be used by the first communication apparatus, at least the identification information to the second communication apparatus;
a recording unit configured to record management information received from the second communication apparatus; and
a request unit configured to transmit a service use request to the information processing apparatus using the management information.

13. A control method for a second communication apparatus which is communicably connected to a first communication apparatus for using a service and an information processing apparatus for providing the service, and makes settings about the service to be used by the first communication apparatus, the method comprising the steps of:
transmitting, to the information processing apparatus, an issuance request of management information about the settings of the service to be used by the first communication apparatus;
receiving the management information from the information processing apparatus in response to the issuance request of the management information;
recording the received management information;
acquiring, among identification information of the first communication apparatus and management information about the settings of the service to be used by the first communication apparatus, at least the identification information from the first communication apparatus; and
transmitting, to the first communication apparatus, the management information which is received from the information processing apparatus in response to the issuance request of the management information which is transmitted to the information processing apparatus if the management information is not acquired from the first communication apparatus and the management information is not recorded,
wherein in the step of recording, the management information transmitted to the first communication apparatus and the identification information acquired from the first communication apparatus are recorded in association with each other.

14. A non-transitory computer-readable storage medium storing a program for causing a computer to execute the control method according to claim 13.

15. A control method for an information processing apparatus which provides a service to be used by a first communication apparatus, the method comprising the steps of:
communicating with a second communication apparatus for making settings about the service to be used by the first communication apparatus;
receiving an issuance request of management information from the second communication apparatus;
generating the management information and transmitting the management information to the second communication apparatus in response to the issuance request of the management information received from the second communication apparatus;
receiving, from the second communication apparatus, the management information and service-related information set about the service; and
storing the service-related information and the management information in association with each other.

16. A non-transitory computer-readable storage medium storing a program for causing a computer to execute the control method according to claim 15.

17. A control method for a first communication apparatus which uses a service provided by an information processing apparatus, the method comprising the steps of:
communicating with a second communication apparatus for making settings about the service to be used by the first communication apparatus;
transmitting, among identification information of the first communication apparatus and management information about the settings of the service to be used by the first communication apparatus, at least the identification information to the second communication apparatus;
recording management information received from the second communication apparatus; and transmitting a service use request to the information processing apparatus using the management information.

18. A non-transitory computer-readable storage medium storing a program for causing a computer to execute the control method according to claim 17.

* * * * *